United States Patent
Lin et al.

(10) Patent No.: US 12,047,007 B2
(45) Date of Patent: Jul. 23, 2024

(54) SYSTEMS AND METHODS FOR CONTROLLING GATE VOLTAGE INCREASE ON PRIMARY SIDE TO REDUCE VOLTAGE SPIKE ON SECONDARY SIDE OF SWITCHING POWER SUPPLIES

(71) Applicant: ON-BRIGHT ELECTRONICS (SHANGHAI) CO., LTD., Shanghai (CN)

(72) Inventors: Yuan Lin, Shanghai (CN); Penglin Yang, Shanghai (CN); Dongze Yang, Shanghai (CN); Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 229 days.

(21) Appl. No.: 17/689,860

(22) Filed: Mar. 8, 2022

(65) Prior Publication Data

US 2022/0294355 A1   Sep. 15, 2022

(30) Foreign Application Priority Data

Mar. 11, 2021   (CN) .......................... 202110263198.2

(51) Int. Cl.
*H02M 3/335* (2006.01)
*H02M 1/08* (2006.01)
*H02M 1/44* (2007.01)

(52) U.S. Cl.
CPC ......... *H02M 3/33569* (2013.01); *H02M 1/08* (2013.01); *H02M 1/44* (2013.01)

(58) Field of Classification Search
CPC ....... H02M 3/33569; H02M 1/08; H02M 1/44
See application file for complete search history.

(56) References Cited

U.S. PATENT DOCUMENTS

| 6,069,804 | A | 5/2000 | Ingman et al. |
| 6,091,233 | A | 7/2000 | Hwang et al. |

(Continued)

FOREIGN PATENT DOCUMENTS

| CN | 2529442 Y | 1/2003 |
| CN | 101106333 A | 1/2008 |

(Continued)

OTHER PUBLICATIONS

United States Patent and Trademark Office, Notice of Allowance mailed Apr. 27, 2023, in U.S. Appl. No. 17/333,844.

(Continued)

*Primary Examiner* — Kyle J Moody
(74) *Attorney, Agent, or Firm* — Faegre Drinker Biddle & Reath LLP

(57) ABSTRACT

Controller and method for a switching power supply. For example, a controller for a switching power supply includes: a first terminal configured to receive a feedback voltage representing an output voltage associated with a secondary winding of the switching power supply; a second terminal configured to output a drive voltage to a first transistor associated with a primary winding coupled to the secondary winding of the switching power supply; a comparator configured to receive the feedback voltage and a predetermined feedback threshold and generate a comparison signal based at least in part on the feedback voltage and the predetermined feedback threshold; a pulse-width detector configured to detect a pulse width of the drive voltage during a first switching cycle, compare the detected pulse width with a predetermined time threshold, and generate a detection signal based at least in part on the detected pulse width and the predetermined time threshold.

21 Claims, 9 Drawing Sheets

(56) References Cited

U.S. PATENT DOCUMENTS

| | | |
|---|---|---|
| 6,198,638 B1 | 3/2001 | Lee |
| 6,972,969 B1 | 12/2005 | Shteynberg et al. |
| 7,173,835 B1 | 2/2007 | Yang |
| 7,447,049 B2 | 11/2008 | Garner et al. |
| 7,768,801 B2 | 8/2010 | Usui et al. |
| 7,791,903 B2 | 9/2010 | Zhang et al. |
| 7,826,237 B2 | 11/2010 | Zhang et al. |
| 7,869,231 B2 | 1/2011 | Cohen |
| 7,952,894 B2 | 5/2011 | Lin et al. |
| 8,102,676 B2 | 1/2012 | Huynh et al. |
| 8,134,851 B2 | 3/2012 | Soldano et al. |
| 8,391,028 B2 | 3/2013 | Yeh |
| 8,542,507 B2 | 9/2013 | Hsu et al. |
| 8,570,772 B2 | 10/2013 | Morris et al. |
| 8,953,342 B2 | 2/2015 | Fang |
| 9,413,246 B2 | 8/2016 | Luo et al. |
| 9,595,874 B2 | 3/2017 | Cao et al. |
| 9,602,006 B2 | 3/2017 | Fahlenkamp |
| 9,608,532 B2 | 3/2017 | Wong et al. |
| 9,787,198 B1 | 10/2017 | Cao et al. |
| 10,003,268 B2 | 6/2018 | Fang et al. |
| 10,063,153 B2 | 8/2018 | Fang |
| 10,122,284 B2 | 11/2018 | Fang |
| 10,148,189 B2 | 12/2018 | Cao et al. |
| 10,158,298 B2 | 12/2018 | Lin et al. |
| 10,193,451 B2 | 1/2019 | Luo et al. |
| 10,270,354 B1 | 4/2019 | Lu et al. |
| 10,411,604 B2 | 9/2019 | Cao et al. |
| 10,411,605 B2 | 9/2019 | Cao et al. |
| 10,432,096 B2 | 9/2019 | Fang et al. |
| 10,432,104 B2 | 10/2019 | Li |
| 10,483,856 B2 | 11/2019 | Cao et al. |
| 10,505,442 B2 | 12/2019 | Wong et al. |
| 10,516,341 B1 | 12/2019 | Fu et al. |
| 10,608,544 B2 | 3/2020 | Moon et al. |
| 10,622,902 B2 | 4/2020 | Cao et al. |
| 10,622,903 B2 | 4/2020 | Cao et al. |
| 10,651,747 B2 | 5/2020 | Cao et al. |
| 10,756,640 B1 | 8/2020 | Radic et al. |
| 10,819,211 B2 | 10/2020 | Yang et al. |
| 11,005,364 B1 | 5/2021 | Radic |
| 11,581,815 B2 | 2/2023 | Cao et al. |
| 11,588,405 B2 | 2/2023 | Cao et al. |
| 11,757,366 B2 | 9/2023 | Cao et al. |
| 11,764,684 B2 | 9/2023 | Cao et al. |
| 11,764,697 B2 | 9/2023 | Zhao et al. |
| 2002/0114172 A1 | 8/2002 | Webb et al. |
| 2003/0117119 A1 | 6/2003 | Bridge |
| 2004/0125621 A1 | 7/2004 | Yang et al. |
| 2005/0024897 A1 | 2/2005 | Yang et al. |
| 2005/0057951 A1 | 3/2005 | Berghegger |
| 2006/0018135 A1 | 1/2006 | Yang et al. |
| 2007/0014133 A1 | 1/2007 | Shao et al. |
| 2007/0139095 A1 | 6/2007 | Fang et al. |
| 2008/0037302 A1 | 2/2008 | Yang |
| 2008/0309312 A1* | 12/2008 | Lin ............... H02M 3/33507 323/318 |
| 2009/0168464 A1 | 7/2009 | Lin et al. |
| 2009/0257644 A1 | 10/2009 | Dodzin et al. |
| 2009/0322300 A1 | 12/2009 | Melanson et al. |
| 2010/0008106 A1* | 1/2010 | Kawabe ............ H02M 3/33507 363/21.01 |
| 2010/0027298 A1 | 2/2010 | Cohen |
| 2010/0128501 A1 | 5/2010 | Huang et al. |
| 2010/0219802 A1 | 9/2010 | Lin et al. |
| 2011/0002145 A1 | 1/2011 | Halberstadt |
| 2011/0019446 A1 | 1/2011 | Wu et al. |
| 2011/0044076 A1 | 2/2011 | Zhang et al. |
| 2011/0157919 A1 | 6/2011 | Yedevelly |
| 2011/0169463 A1 | 7/2011 | Yang et al. |
| 2011/0305055 A1 | 12/2011 | Hsu et al. |
| 2012/0032708 A1 | 2/2012 | Coleman |
| 2012/0075891 A1 | 3/2012 | Zhang et al. |
| 2012/0300506 A1* | 11/2012 | Lee ............... H02M 3/33507 363/21.13 |
| 2012/0300520 A1 | 11/2012 | Ren et al. |
| 2013/0033236 A1 | 2/2013 | Li et al. |
| 2013/0235620 A1 | 9/2013 | Morris et al. |
| 2013/0258723 A1 | 10/2013 | Fang et al. |
| 2013/0272036 A1 | 10/2013 | Fang |
| 2014/0021786 A1 | 1/2014 | Fang |
| 2014/0204625 A1 | 7/2014 | Liu et al. |
| 2014/0218976 A1 | 8/2014 | Luo et al. |
| 2014/0368254 A1 | 12/2014 | Lee et al. |
| 2015/0070944 A1 | 3/2015 | Fang |
| 2015/0229223 A1 | 8/2015 | Cao et al. |
| 2015/0249380 A1 | 9/2015 | Hayakawa et al. |
| 2015/0280584 A1 | 10/2015 | Gong et al. |
| 2016/0141961 A1 | 5/2016 | Odell et al. |
| 2016/0149499 A1 | 5/2016 | Fang |
| 2016/0322909 A1 | 11/2016 | Cao et al. |
| 2017/0005578 A1 | 1/2017 | Luo et al. |
| 2017/0126138 A1 | 5/2017 | Cao et al. |
| 2017/0155322 A1 | 6/2017 | Zhang et al. |
| 2017/0222569 A1 | 8/2017 | Choi et al. |
| 2017/0264287 A1 | 9/2017 | Osanai |
| 2017/0353099 A1 | 12/2017 | Yang et al. |
| 2018/0013352 A1 | 1/2018 | Cao et al. |
| 2018/0034377 A1 | 2/2018 | Cao et al. |
| 2018/0076720 A1 | 3/2018 | Cao et al. |
| 2018/0248488 A1 | 8/2018 | Cao et al. |
| 2018/0294735 A1 | 10/2018 | Song et al. |
| 2019/0068073 A1 | 2/2019 | Cao et al. |
| 2019/0393767 A1 | 12/2019 | Hwang et al. |
| 2019/0393790 A1 | 12/2019 | Cao et al. |
| 2020/0161985 A1 | 5/2020 | Li et al. |
| 2020/0280259 A1 | 9/2020 | Cao et al. |
| 2020/0280260 A1 | 9/2020 | Cao et al. |
| 2020/0336071 A1 | 10/2020 | Iorio et al. |
| 2020/0343810 A1 | 10/2020 | Xu et al. |
| 2021/0091675 A1 | 3/2021 | Rajesh et al. |
| 2021/0226540 A1 | 7/2021 | Zhao et al. |
| 2021/0376746 A1 | 12/2021 | Cao et al. |
| 2022/0006392 A1 | 1/2022 | Chen et al. |
| 2022/0329171 A1 | 10/2022 | Zhao et al. |
| 2023/0010393 A1 | 1/2023 | Zhao |
| 2023/0033953 A1 | 2/2023 | Cao |
| 2024/0063724 A1 | 2/2024 | Cao et al. |
| 2024/0072678 A1 | 2/2024 | Zhao et al. |

FOREIGN PATENT DOCUMENTS

| | | |
|---|---|---|
| CN | 101188384 A | 5/2008 |
| CN | 101272089 A | 9/2008 |
| CN | 101378232 A | 3/2009 |
| CN | 201238265 Y | 5/2009 |
| CN | 201435677 Y | 3/2010 |
| CN | 101841247 A | 9/2010 |
| CN | 102017376 A | 4/2011 |
| CN | 102104338 A | 6/2011 |
| CN | 102217181 A | 10/2011 |
| CN | 102231605 A | 11/2011 |
| CN | 102647074 A | 8/2012 |
| CN | 102723856 A | 10/2012 |
| CN | 102790531 A | 11/2012 |
| CN | 102882377 A | 1/2013 |
| CN | 103296867 A | 9/2013 |
| CN | 103378751 A | 10/2013 |
| CN | 103501112 A | 1/2014 |
| CN | 103728572 A | 4/2014 |
| CN | 103887980 A | 6/2014 |
| CN | 102185501 B | 9/2014 |
| CN | 104300793 A | 1/2015 |
| CN | 104393763 A | 3/2015 |
| CN | 105322800 A | 2/2016 |
| CN | 105356727 A | 2/2016 |
| CN | 106026703 A | 10/2016 |
| CN | 107104598 A | 8/2017 |
| CN | 206379873 U | 8/2017 |
| CN | 107342691 A | 11/2017 |
| CN | 107579670 A | 1/2018 |
| CN | 107872158 A | 4/2018 |
| CN | 107979289 A | 5/2018 |
| CN | 108566104 A | 9/2018 |

(56) References Cited

FOREIGN PATENT DOCUMENTS

| | | | |
|---|---|---|---|
| CN | 105846695 B | 11/2018 | |
| CN | 108736749 A | 11/2018 | |
| CN | 108880296 A | 11/2018 | |
| CN | 109274272 A | 1/2019 | |
| CN | 106130349 B | 3/2019 | |
| CN | 109802559 A | 5/2019 | |
| CN | 110620514 A | 12/2019 | |
| CN | 209913730 U | 1/2020 | |
| CN | 110896283 A | 3/2020 | |
| CN | 110995013 A | 4/2020 | |
| CN | 111146961 A | 5/2020 | |
| CN | 111193407 A | 5/2020 | |
| CN | 111404403 A | 7/2020 | |
| CN | 211296573 U | 8/2020 | |
| CN | 111697838 A | 9/2020 | |
| CN | 111865095 A | 10/2020 | |
| CN | 112688570 A | 4/2021 | |
| CN | 112803773 A | 5/2021 | |
| EP | 2525480 A1 | 11/2012 | |
| JP | 2000-014136 A | 1/2000 | |
| JP | 2007-028894 A | 2/2007 | |
| JP | 2009-124296 A | 6/2009 | |
| JP | 2009-261042 A | 11/2009 | |
| JP | 2009-278717 A | 11/2009 | |
| JP | 5285602 B2 | 9/2013 | |
| JP | 6351787 B2 | 7/2018 | |
| TW | 200717978 A | 5/2007 | |
| TW | I366335 B | 6/2012 | |
| TW | 201234854 A | 8/2012 | |
| TW | I401866 B | 7/2013 | |
| TW | I436571 B | 5/2014 | |
| TW | I448064 B | 8/2014 | |
| TW | 201521347 A | 6/2015 | |
| TW | I489751 B | 6/2015 | |
| TW | 201537882 A | 10/2015 | |
| TW | I509971 B | 11/2015 | |
| TW | 201707361 A | 2/2017 | |
| TW | I625924 B | 6/2018 | |
| TW | I635699 B | 9/2018 | |
| TW | 201919322 A | 5/2019 | |
| TW | 201933752 A | 8/2019 | |
| TW | 201937834 A | 9/2019 | |
| TW | 202002494 A | 1/2020 | |
| TW | 202019066 A | 5/2020 | |
| TW | 202110051 A | 3/2021 | |
| TW | 202114333 A | 3/2021 | |

OTHER PUBLICATIONS

United States Patent and Trademark Office, Notice of Allowance mailed May 12, 2023, in U.S. Appl. No. 16/786,372.
United States Patent and Trademark Office, Notice of Allowance mailed May 5, 2023, in U.S. Appl. No. 17/152,418.
Chinese Patent Office, Office Action issued Apr. 6, 2022, in Application No. 202110771012.4.
Chinese Patent Office, Office Action issued Dec. 20, 2017, in Application No. 201610345719.8.
Chinese Patent Office, Office Action issued Dec. 30, 2021, in Application No. 202110379198.9.
Chinese Patent Office, Office Action issued Jan. 26, 2014, in Application No. 201210118202. 7.
Chinese Patent Office, Office Action issued Jul. 5, 2022, in Application No. 202110865735.0.
Chinese Patent Office, Office Action issued Mar. 1, 2022, in Application No. 202110379198.9.
Chinese Patent Office, Office Action issued Mar. 19, 2021, in Application No. 202010063404.0.
Chinese Patent Office, Office Action issued Mar. 29, 2022, in Application No. 202110263198.2.
Chinese Patent Office, Office Action issued May 25, 2016, in Application No. 201410729533.3.
Chinese Patent Office, Office Action issued Nov. 2, 2021, in Application No. 202110263198.2.
Chinese Patent Office, Office Action issued Nov. 9, 2018, in Application No. 201710534527.6.
Chinese Patent Office, Office Action issued Oct. 28, 2015, in Application No. 201410093010.4.
Chinese Patent Office, Office Action issued Sep. 4, 2018, in Application No. 201710102817.3.
Li, Longwen, "Newest Switch Power Supply Design Procedures and Steps," Chapter 8, Section 4, pp. 455-458, 2008.
Liu, Shengli, "Practical New Technology of High Frequency Switch Power Supply," Chapter 6, pp. 100-117, 2006.
Ren, Zhicheng and Zhou, Zhong, "Principle and Application Guide for Electric Power Digital Meters," pp. 88-89 entitled "TOP221Y Switching Power Supply Voltage Regulator Chip," China Electric Power Publishing: Beijing, China; 2007.
Taiwan Intellectual Property Office, Office Action issued Apr. 13, 2022, in Application No. 110129676.
Taiwan Intellectual Property Office, Office Action issued Dec. 2, 2016, in Application No. 104101330.
Taiwan Intellectual Property Office, Office Action issued Dec. 27, 2017, in Application No. 106111598.
Taiwan Intellectual Property Office, Office Action issued Feb. 23, 2021, in Application No. 109128639.
Taiwan Intellectual Property Office, Office Action issued Mar. 8, 2021, in Application No. 109110084.
Taiwan Intellectual Property Office, Office Action issued May 3, 2022, in Application No. 110138601.
Taiwan Intellectual Property Office, Office Action issued May 4, 2017, in Application No. 105122491.
Taiwan Intellectual Property Office, Office Action issued Oct. 24, 2018, in Application No. 106140199.
Taiwan Intellectual Property Office, Office Action issued Oct. 9, 2014, in Application No. 101118860.
United States Patent and Trademark Office, Notice of Allowance mailed Apr. 15, 2021, in U.S. Appl. No. 16/503,916.
United States Patent and Trademark Office, Notice of Allowance mailed Feb. 8, 2022, in U.S. Appl. No. 16/503,916.
United States Patent and Trademark Office, Notice of Allowance mailed Jul. 12, 2022, in U.S. Appl. No. 16/787,869.
United States Patent and Trademark Office, Notice of Allowance mailed Jul. 13, 2022, in U.S. Appl. No. 16/786,372.
United States Patent and Trademark Office, Notice of Allowance mailed Jul. 6, 2022, in U.S. Appl. No. 16/503,916.
United States Patent and Trademark Office, Office Action mailed Jan. 10, 2020, in U.S. Appl. No. 16/503,916.
United States Patent and Trademark Office, Office Action mailed Sep. 10, 2021, in U.S. Appl. No. 16/786,372.
United States Patent and Trademark Office, Office Action mailed Sep. 18, 2020, in U.S. Appl. No. 16/503,916.
United States Patent and Trademark Office, Office Action mailed Sep. 10, 2021, in U.S. Appl. No. 16/787,869.
Beijing East IP Ltd., Statement attached with a Mailing List, submitted to the State Intellectual Property Office of China on Apr. 29, 2015, and resubmitted to the State Intellectual Property Office of China on Nov. 18, 2015, requesting correction of the filing date for Chinese Patent Application No. 201210118202.7.
State Intellectual Property Office of China, Formal Letter of Examination issued Dec. 2, 2015, in Application No. 201210118202.7.
State Intellectual Property Office of China, print-out of bibliographic data from http://cpquery.sipo.gov.cn of Chinese Patent Application No. 201210118202.7, dated Feb. 25, 2016.
Taiwan Intellectual Property Office, Office Action mailed Oct. 11, 2022, in Application No. 110136342.
United States Patent and Trademark Office, Notice of Allowance mailed Oct. 19, 2022, in U.S. Appl. No. 16/503,916.
United States Patent and Trademark Office, Notice of Allowance mailed Oct. 3, 2022, in U.S. Appl. No. 16/787,869.
United States Patent and Trademark Office, Office Action mailed Oct. 14, 2022, in U.S. Appl. No. 16/786,372.
United States Patent and Trademark Office, Office Action mailed Oct. 17, 2022, in U.S. Appl. No. 17/333,844.
Chinese Patent Office, Office Action issued Mar. 16, 2023, in Application No. 202010471872.1.

(56) References Cited

OTHER PUBLICATIONS

Taiwan Intellectual Property Office, Office Action mailed Nov. 11, 2022, in Application No. 110142621.
United States Patent and Trademark Office, Notice of Allowance mailed Feb. 2, 2023, in U.S. Appl. No. 17/333,844.
United States Patent and Trademark Office, Notice of Allowance mailed Jan. 20, 2023, in U.S. Appl. No. 17/152,418.
United States Patent and Trademark Office, Notice of Allowance mailed Mar. 15, 2023, in U.S. Appl. No. 17/333,844.
United States Patent and Trademark Office, Notice of Allowance mailed Mar. 29, 2023, in U.S. Appl. No. 16/786,372.
United States Patent and Trademark Office, Notice of Allowance mailed Apr. 29, 2024, in U.S. Appl. No. 17/857,475.
United States Patent and Trademark Office, Office Action mailed Mar. 22, 2024, in U.S. Appl. No. 18/229,596.
United States Patent and Trademark Office, Office Action mailed Feb. 29, 2024, in U.S. Appl. No. 18/225,512.

\* cited by examiner

SYSTEMS AND METHODS FOR CONTROLLING GATE VOLTAGE INCREASE ON PRIMARY SIDE TO REDUCE VOLTAGE SPIKE ON SECONDARY SIDE OF SWITCHING POWER SUPPLIES

1. CROSS-REFERENCES TO RELATED APPLICATIONS

This application claims priority to Chinese Patent Application No. 202110263198.2, filed Mar. 11, 2021, incorporated by reference herein for all purposes.

2. BACKGROUND OF THE INVENTION

Certain embodiments of the present invention are directed to circuits. More particularly, some embodiments of the invention provide systems and methods for controlling gate voltage increase on primary side to reduce voltage spike on secondary side of switching power supplies. Merely by way of example, some embodiments of the invention have been applied to flyback switching power supplies. But it would be recognized that the invention has a much broader range of applicability.

Power converters are widely used as power supplies for consumer electronics such as portable devices. The power converters can convert electric power from one form to another form. As an example, the electric power is transformed from alternate current (AC) to direct current (DC), from DC to AC, from AC to AC, or from DC to DC. Additionally, the power converters can convert the electric power from one voltage level to another voltage level.

As an example, the power converters include switch-mode converters, which are used as switching power supplies. FIG. 1 is a simplified diagram showing a conventional switching power supply. The switching power supply 100 includes a pulse-width-modulation (PWM) controller 110, a synchronous-rectifier (SR) controller 120, an error amplifier 130, an optocoupler 140, a transformer 160, switches 170 and 172, a capacitor 174, and a resistor 176. The transformer 160 includes a primary winding 162 and a secondary winding 164 that is coupled to the primary winding 162. The switch 170 (e.g., a transistor) is on the primary side of the switching power supply 100, and the switch 172 (e.g., a transistor) is on the secondary side of the switching power supply 100.

As shown in FIG. 1, the switching power supply 100 is a flyback switching power supply. The primary winding 162 receives an input voltage 166 (e.g., $V_{in}$), and the switching power supply 100 provides an output voltage 152 (e.g., $V_{out}$) and an output current 156 (e.g., $I_{out}$) to a load 150. For example, the input voltage 166 (e.g., $V_{in}$) is generated from an AC voltage through a rectification process performed by a rectification circuit (e.g., a full-wave bridge rectifier) that receives the AC voltage and then through a smoothing process performed by a capacitor that is connected to an output terminal of the rectification circuit. As an example, based at least in part on the input voltage 166 (e.g., $V_{in}$) and/or the output voltage 152 (e.g., $V_{out}$), the switching power supply 100 operates in a critical conduction mode (CRM), a discontinuous conduction mode (DCM), and/or a continuous conduction mode (CCM). For example, the continuous conduction mode (CCM) includes the deep continuous conduction mode (DCCM).

The switch 170 (e.g., a transistor) is connected to the primary winding 162, the resistor 176 (e.g., $R_{sense}$) and the PWM controller 110. The PWM controller 110 controls the closing and/or opening of the switch 170 (e.g., the turning-on and/or turning-off of a transistor). Additionally, the switch 172 is connected to the secondary winding 164 of the transformer 160. Also, the SR controller 120 controls the closing and/or opening of the switch 172 (e.g., the turning-on and/or turning-off of a transistor).

The PWM controller 110 includes a terminal 112 (e.g., GATE), a terminal 114 (e.g., CS), and a terminal 116 (e.g., FB). The terminal 116 (e.g., FB) receives a feedback signal 142 (e.g., a feedback voltage), which is generated by the error amplifier 130 and the optocoupler 140. The feedback signal 142 represents the output voltage 152 (e.g., $V_{out}$), which is received by the load 150. Additionally, the terminal 114 (e.g., CS) receives a voltage signal 144, which is generated by the resistor 176 (e.g., $R_{sense}$). The voltage signal 144 represents a current 146 that flows through the resistor 176 (e.g., $R_{sense}$) from the primary winding 162. Also, the terminal 112 (e.g., GATE) outputs a drive signal 148 (e.g., a drive voltage) to the switch 170 (e.g., a transistor) to control the closing and/or opening of the switch 170 (e.g., the turning-on and/or turning-off of a transistor).

The transistor 170 includes a drain terminal 180, a gate terminal 182, and a source terminal 184, and the resistor 176 (e.g., $R_{sense}$) includes a terminal 186 and a terminal 188. The drain terminal 180 is connected to the primary winding 162, and the gate terminal 182 receives the drive signal 148 from the terminal 112 (e.g., GATE). The source terminal 184 is connected to the terminal 186, and the terminal 188 is biased to a ground voltage. The terminal 114 (e.g., CS) receives the voltage signal 144 from the source terminal 184 of the transistor 170 and the terminal 186 of the resistor 176 (e.g., $R_{sense}$).

The SR controller 120 includes an output terminal 122 and an input terminal 124. The transistor 172 includes a drain terminal 190, a gate terminal 192, and a source terminal 194. The drain terminal 190 is connected to the input terminal 124 of the SR controller 120, and the gate terminal 192 is connected to the output terminal 122 of the SR controller 120. The output terminal 122 of the SR controller 120 sends a drive signal 196 (e.g., a drive voltage) to the gate terminal 192 of the transistor 172.

The error amplifier 130 includes an input terminal 132 and an output terminal 134, and the optocoupler 140 includes input terminals 136 and 138 and an output terminal 154. The output voltage 152 (e.g., $V_{out}$) is received by the input terminal 132 of the error amplifier 130 and the input terminal 138 of the optocoupler 140. As shown in FIG. 1, the output terminal 134 of the error amplifier 130 is connected to the input terminal 136 of the optocoupler 140, and the output terminal 154 of the optocoupler 140 is connected to the terminal 116 (e.g., FB) of the PWM controller 110. The terminal 116 (e.g., FB) receives the feedback signal 142 from the output terminal 154 of the optocoupler 140.

FIG. 2 is a simplified diagram showing the conventional pulse-width-modulation (PWM) controller 110 as part of the switching power supply 100 as shown in FIG. 1. The PWM controller 110 includes a current mirror 210, a current source 216, a transistor 220 (e.g., an NMOS transistor), a transistor 222 (e.g., an NMOS transistor), and a transistor 224 (e.g., an NMOS transistor), a high-side driver 230, a low-side driver 232, an over-current-protection comparator 240, a Zener diode 242, and a capacitor 244. The current mirror 210 includes a transistor 212 (e.g., a PMOS transistor) and a transistor 214 (e.g., a PMOS transistor).

As shown in FIG. 2, the current source 216 generates a current 217, and the current mirror 210 uses the current 217 to generate an output current 213. For example, the output current 213 is equal to the current 217 multiplied by a predetermined constant. A drain terminal of the transistor 224 is connected to an output terminal of the current mirror 210, and a source terminal of the transistor 224 is biased to a ground voltage. A gate terminal of the transistor 224 is connected to an output terminal of the high-side driver 230, and an input terminal of the high-side driver 230 is connected to an output terminal of the over-current-protection comparator 240. The output terminal of the over-current-protection comparator 240 is connected to an input terminal of the low-side driver 232. An input terminal of the over-current-protection comparator 240 is connected, through the terminal 114 (e.g., CS), to the source terminal 184 of the transistor 170 and the terminal 186 of the resistor 176. Another input terminal of the over-current-protection comparator 240 receives a predetermined reference voltage.

An output terminal of the low-side driver 232 is connected to a gate terminal of the transistor 220. A drain terminal of the transistor 222 receives a voltage 226 (e.g., Vcc), a source terminal of the transistor 222 is connected to a drain terminal of the transistor 220, and a source terminal of the transistor 220 is biased to a ground voltage. A gate terminal of the transistor 222 is connected to the drain terminal of the transistor 224, one terminal of the Zener diode 242, and one terminal of the capacitor 244. Another terminal of the Zener diode 242 is biased to the ground voltage, and another terminal of the capacitor 244 is also biased to the ground voltage.

If the transistor 220 is turned on and the transistor 222 is turned off, the drive signal 148 is at a logic low level and the transistor 170 is turned off. If the transistor 220 is turned off and the transistor 222 is turned on, the drive signal 148 is at a logic high level and the transistor 170 is turned on. The source terminal of the transistor 222 is connected to the terminal 112 (e.g., GATE) and the gate terminal of the transistor 222 is connected to the transistor 212 and the transistor 224, forming a drive component of the PWM controller 110. The maximum value of the voltage at the gate terminal of the transistor 222 is limited by the Zener diode 242 in order to control the maximum value of the voltage at the terminal 112 (e.g., GATE).

Usually, the voltage value of the drive signal 148 increases in three stages A, B, and C as shown in FIG. 2. The waveform 290 represents a voltage 223 at the gate terminal of the transistor 222 as a function of time. During the stage A, when the voltage value of the drive signal 148 is lower than the threshold voltage (e.g., Vth) of the transistor 170 and the transistor 170 is in an off state, the voltage 223 at the gate terminal of the transistor 222 rises rapidly. During the stage B, the voltage 223 at the gate terminal of the transistor 222 rises less rapidly than during the stage A in order to reduce the electromagnetic interference (EMI). During the stage C, when the transistor 170 is fully turned on, the voltage 223 at the gate terminal of the transistor 222 rises more rapidly than during the stage B, in order to reduce the switching loss of the transistor 170 and improve the efficiency of the switching power supply 100.

Hence it is highly desirable to improve the techniques related to switching power supplies.

3. BRIEF SUMMARY OF THE INVENTION

Certain embodiments of the present invention are directed to circuits. More particularly, some embodiments of the invention provide systems and methods for controlling gate voltage increase on primary side to reduce voltage spike on secondary side of switching power supplies. Merely by way of example, some embodiments of the invention have been applied to flyback switching power supplies. But it would be recognized that the invention has a much broader range of applicability.

According to some embodiments, a controller for a switching power supply includes: a first terminal configured to receive a feedback voltage representing an output voltage associated with a secondary winding of the switching power supply; a second terminal configured to output a drive voltage to a first transistor associated with a primary winding coupled to the secondary winding of the switching power supply; a comparator configured to receive the feedback voltage and a predetermined feedback threshold and generate a comparison signal based at least in part on the feedback voltage and the predetermined feedback threshold; a pulse-width detector configured to detect a pulse width of the drive voltage during a first switching cycle, compare the detected pulse width with a predetermined time threshold, and generate a detection signal based at least in part on the detected pulse width and the predetermined time threshold, the detected pulse width representing a length of time when the first transistor is turned on during the first switching cycle; a control signal generator configured to receive the comparison signal and the detection signal and generate a control signal based at least in part on the comparison signal and the detection signal; a current source configured to receive the control signal and generate a first current based at least in part on the control signal; a current mirror configured to generate a second current based at least in part on the first current; and a drive voltage generator configured to use the second current to raise the drive voltage at a rate of change to turn on the first transistor during a second switching cycle, the second switching cycle following the first switching cycle; wherein the current source is further configured to: generate the first current at a first magnitude if the feedback voltage is larger than the predetermined feedback threshold and the detected pulse width is larger than the predetermined time threshold; generate the first current at a second magnitude if the feedback voltage is smaller than the predetermined feedback threshold; and generate the first current at the second magnitude if the detected pulse width is smaller than the predetermined time threshold; wherein the drive voltage generator is further configured to: during the second switching cycle, raise the drive voltage at the rate of change equal to a first rate of increase in response to the first current being at the first magnitude; and during the second switching cycle, raise the drive voltage at the rate of change equal to a second rate of increase in response to the first current being at the second magnitude; wherein: the first magnitude is smaller than the second magnitude; and the first rate of increase is smaller than the second rate of increase.

According to certain embodiments, a controller for a switching power supply includes: a terminal configured to output a drive voltage to a first transistor associated with a primary winding coupled to a secondary winding of the switching power supply; a voltage detector configured to receive an input voltage associated with the primary winding, compare the input voltage with a first predetermined threshold, and generate a first detection signal based at least in part on the input voltage and the first predetermined threshold; a load detector configured to generate a second detection signal and change the second detection signal if an output current associated with the secondary winding becomes larger than a second predetermined threshold; a control signal generator configured to receive the first detection signal and the second detection signal and generate a control signal based at least in part on the first detection signal and the second detection signal; a current source configured to receive the control signal and generate a first current based at least in part on the control signal; a current mirror configured to generate a second current based at least in part on the first current; and a drive voltage generator configured to use the second current to raise the drive voltage at a rate of change to turn on the first transistor; wherein the current source is further configured to: generate the first current at a first magnitude if the input voltage is larger than the first predetermined threshold and the output current is larger than the second predetermined threshold; generate the first current at a second magnitude if the input voltage is smaller than the first predetermined threshold; and generate the first current at the second magnitude if the output current is smaller than the second predetermined threshold; wherein the drive voltage generator is further configured to: raise the drive voltage at the rate of change equal to a first rate of increase in response to the first current being at the first magnitude; and raise the drive voltage at the rate of change equal to a second rate of increase in response to the first current being at the second magnitude; wherein: the first magnitude is smaller than the second magnitude; and the first rate of increase is smaller than the second rate of increase.

According to some embodiments, a method for a switching power supply includes: receiving a feedback voltage representing an output voltage associated with a secondary winding of the switching power supply; outputting a drive voltage to a first transistor associated with a primary winding coupled to the secondary winding of the switching power supply; receiving the feedback voltage and a predetermined feedback threshold; generating a comparison signal based at least in part on the feedback voltage and the predetermined feedback threshold; detecting a pulse width of the drive voltage during a first switching cycle, the detected pulse width representing a length of time when the first transistor is turned on during the first switching cycle; comparing the detected pulse width with a predetermined time threshold; generating a detection signal based at least in part on the detected pulse width and the predetermined time threshold; receiving the comparison signal and the detection signal; generating a control signal based at least in part on the comparison signal and the detection signal; receiving the control signal; generating a first current based at least in part on the control signal; generating a second current based at least in part on the first current; and using the second current to raise the drive voltage at a rate of change to turn on the first transistor during a second switching cycle, the second switching cycle following the first switching cycle; wherein the generating a first current based at least in part on the control signal includes: generating the first current at a first magnitude if the feedback voltage is larger than the predetermined feedback threshold and the detected pulse width is larger than the predetermined time threshold; generating the first current at a second magnitude if the feedback voltage is smaller than the predetermined feedback threshold; and generating the first current at the second magnitude if the detected pulse width is smaller than the predetermined time threshold; wherein the outputting a drive voltage to a first transistor associated with a primary winding coupled to the secondary winding of the switching power supply includes: during the second switching cycle, raising the drive voltage at the rate of change equal to a first rate of increase in response to the first current being at the first magnitude; and during the second switching cycle, raising the drive voltage at the rate of change equal to a second rate of increase in response to the first current being at the second magnitude; wherein: the first magnitude is smaller than the second magnitude; and the first rate of increase is smaller than the second rate of increase.

According to certain embodiments, a method for a switching power supply includes: outputting a drive voltage to a first transistor associated with a primary winding coupled to a secondary winding of the switching power supply; receiving an input voltage associated with the primary winding; comparing the input voltage with a first predetermined threshold; generating a first detection signal based at least in part on the input voltage and the first predetermined threshold; generating a second detection signal; changing the second detection signal if an output current associated with the secondary winding becomes larger than a second predetermined threshold; receiving the first detection signal and the second detection signal; generating a control signal based at least in part on the first detection signal and the second detection signal; receiving the control signal; generating a first current based at least in part on the control signal; generating a second current based at least in part on the first current; and using the second current to raise the drive voltage at a rate of change to turn on the first transistor; wherein the generating a first current based at least in part on the control signal includes: generating the first current at a first magnitude if the input voltage is larger than the first predetermined threshold and the output current is larger than the second predetermined threshold; generating the first current at a second magnitude if the input voltage is smaller than the first predetermined threshold; and generating the first current at the second magnitude if the output current is smaller than the second predetermined threshold; wherein the outputting a drive voltage to a first transistor associated with a primary winding coupled to a secondary winding of the switching power supply includes: raising the drive voltage at the rate of change equal to a first rate of increase in response to the first current being at the first magnitude; and raising the drive voltage at the rate of change equal to a second rate of increase in response to the first current being at the second magnitude; wherein: the first magnitude is smaller than the second magnitude; and the first rate of increase is smaller than the second rate of increase.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

Certain embodiments of the present invention are directed to circuits. More particularly, some embodiments of the invention provide systems and methods for controlling gate voltage increase on primary side to reduce voltage spike on secondary side of switching power supplies. Merely by way of example, some embodiments of the invention have been applied to flyback switching power supplies. But it would be recognized that the invention has a much broader range of applicability.

Figure 1:
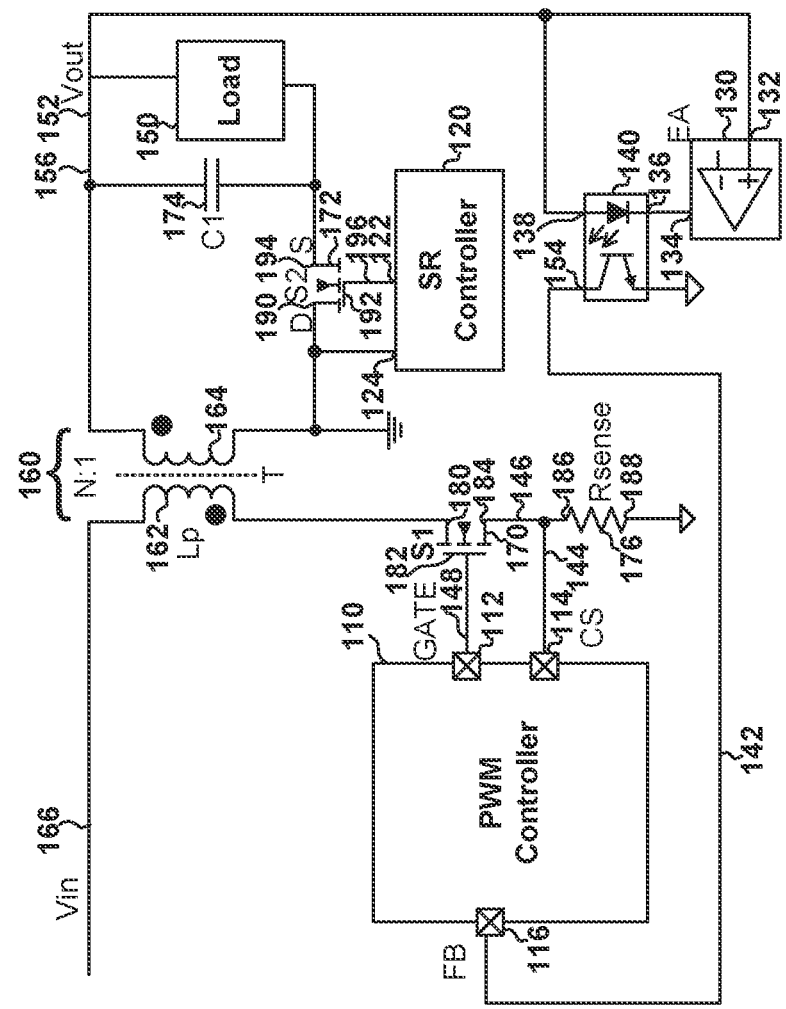
FIG. 1 is a simplified diagram showing a conventional switching power supply.
Figure 2:
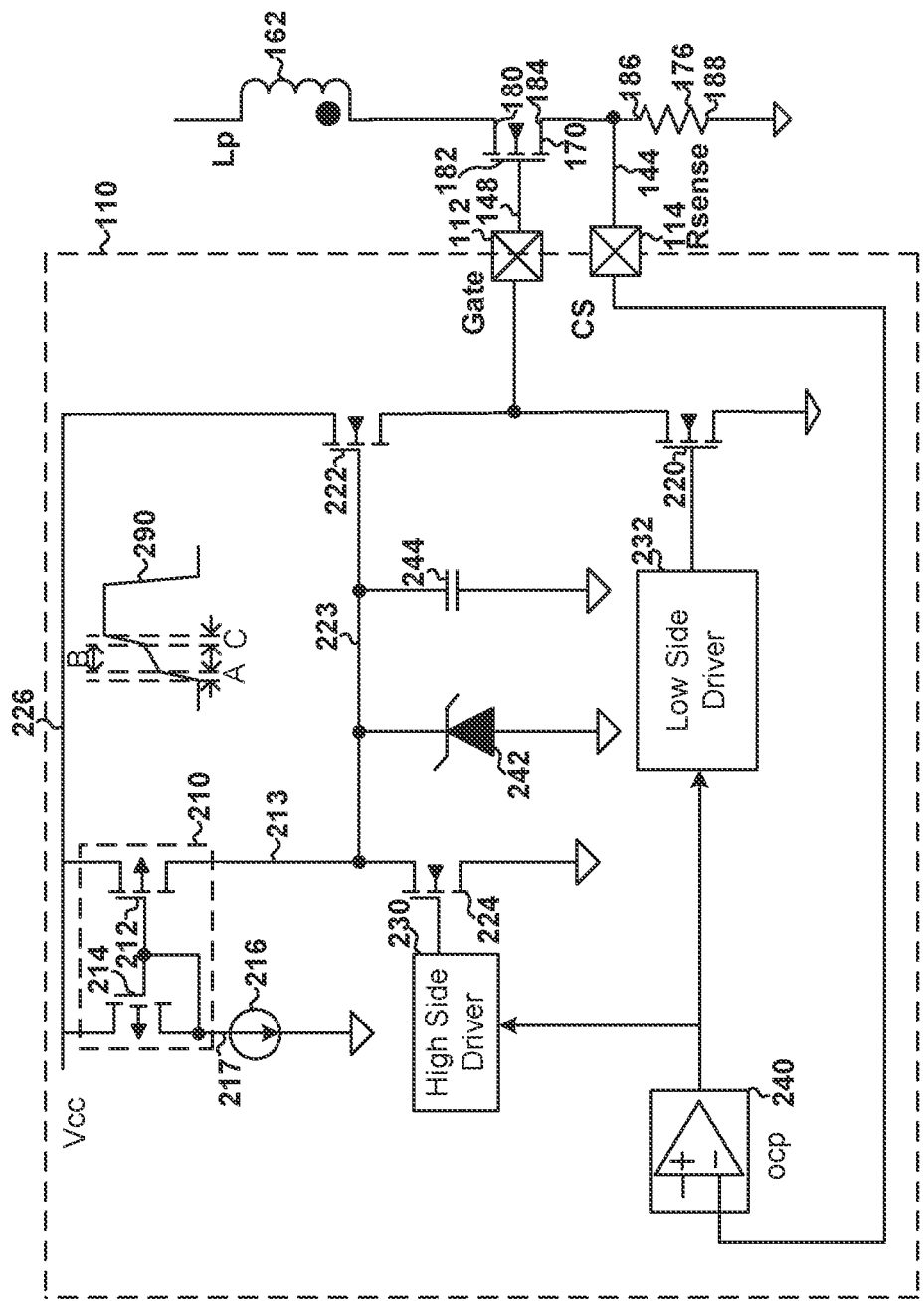
FIG. 2 is a simplified diagram showing the conventional pulse-width-modulation (PWM) controller as part of the switching power supply as shown in FIG. 1.

Referring to FIG. 1 and FIG. 2, when the switching power supply 100 operates in the continuous conduction mode (e.g., the deep continuous conduction mode), if the switch 170 (e.g., a transistor) is closed (e.g., turned on) before the switch 172 (e.g., a transistor) is turned off, a current that flows through the switch 170 (e.g., a transistor) and a current that flows through the switch 172 (e.g., a transistor) become excessive, causing a voltage difference (e.g., $V_{ds2}$) from the drain terminal 190 to the source terminal 194 of the transistor 172 to form a spike in magnitude according to some embodiments. For example, if the time duration when both the switches 170 and 172 are closed becomes longer, the spike of the voltage difference (e.g., $V_{ds2}$) also becomes larger.

Figure 3:
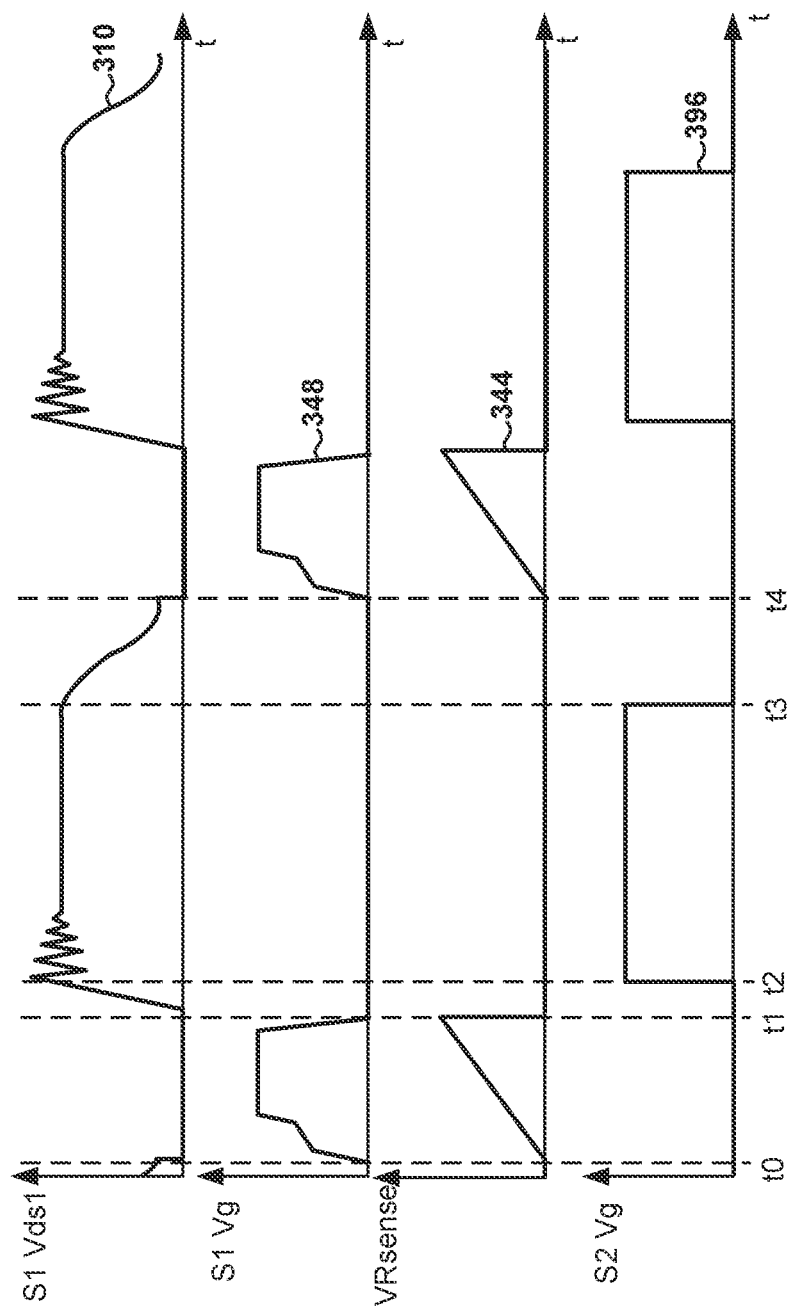
FIG. 3 shows a simplified timing diagram for the conventional switching power supply as shown in FIG. 1 operating in the discontinuous conduction mode according to certain embodiments.

FIG. 3 shows a simplified timing diagram for the conventional switching power supply 100 as shown in FIG. 1 operating in the discontinuous conduction mode according to certain embodiments. The waveform 310 represents a voltage difference (e.g., $V_{ds1}$) from the drain terminal 180 to the source terminal 184 of the transistor 170 as a function of time, the waveform 348 represents the drive signal 148 (e.g., a drive voltage) that is received by the gate terminal 182 of the transistor 170 as a function of time, the waveform 344 represents the voltage signal 144 that is generated by the resistor 176 (e.g., $R_{sense}$) as a function of time, and the waveform 396 represents the drive signal 196 (e.g., a drive voltage) that is received by the gate terminal 192 of the transistor 172 as a function of time.

In some examples, the time duration from time $t_0$ to time $t_4$ represents one switching cycle of the switching power supply 100. As an example, at time to, the voltage difference (e.g., $V_{ds1}$) from the drain terminal 180 to the source terminal 184 drops to a valley, the transistor 170 starts being turned on as shown by the waveform 348, and the transistor 172 remains turned off as shown by the waveform 396. In certain examples, from time $t_0$ to time $t_1$, the transistor 170 is turned on as shown by the waveform 348, and the transistor 172 remains turned off as shown by the waveform 396. For example, at time $t_1$, the transistor 170 becomes turned off as shown by the waveform 348, and the voltage difference (e.g., $V_{ds1}$) from the drain terminal 180 to the source terminal 184 of the transistor 170 starts to increase as shown by the waveform 310. In some examples, from time $t_1$ to time $t_2$, the voltage difference (e.g., $V_{ds1}$) from the drain terminal 180 to the source terminal 184 of the transistor 170 increases as shown by the waveform 310, the transistor 170 remains turned off as shown by the waveform 348, and the transistor 172 remains turned off as shown by the waveform 396. As an example, at time $t_2$, the SR controller 120 detects that one or more predetermined conditions are satisfied and also turns on the transistor 172 as shown by the waveform 396.

In certain examples, from time $t_2$ to time $t_3$, the transistor 170 remains turned off as shown by the waveform 348, and the transistor 172 remains turned on as shown by the waveform 396. For example, at time $t_3$, the demagnetization process of the transformer 160 is completed, and the SR controller 120 turns off the transistor 172 as shown by the waveform 396. In some examples, from time $t_3$ to time $t_4$, the transistor 170 remains turned off as shown by the waveform 348, the transistor 172 remains turned off as shown by the waveform 396, and the primary winding 162 and the parasitic capacitor between the drain terminal 180 and the source terminal 184 of the transistor 170 undergo free oscillation and cause the voltage difference (e.g., $V_{ds1}$) from the drain terminal 180 to the source terminal 184 to decrease as shown by the waveform 310. As an example, at time $t_4$, the voltage difference (e.g., $V_{ds1}$) from the drain terminal 180 to the source terminal 184 drops to a valley, the transistor 170 starts being turned on as shown by the waveform 348, and the transistor 172 remains turned off as shown by the waveform 396.

Figure 4:
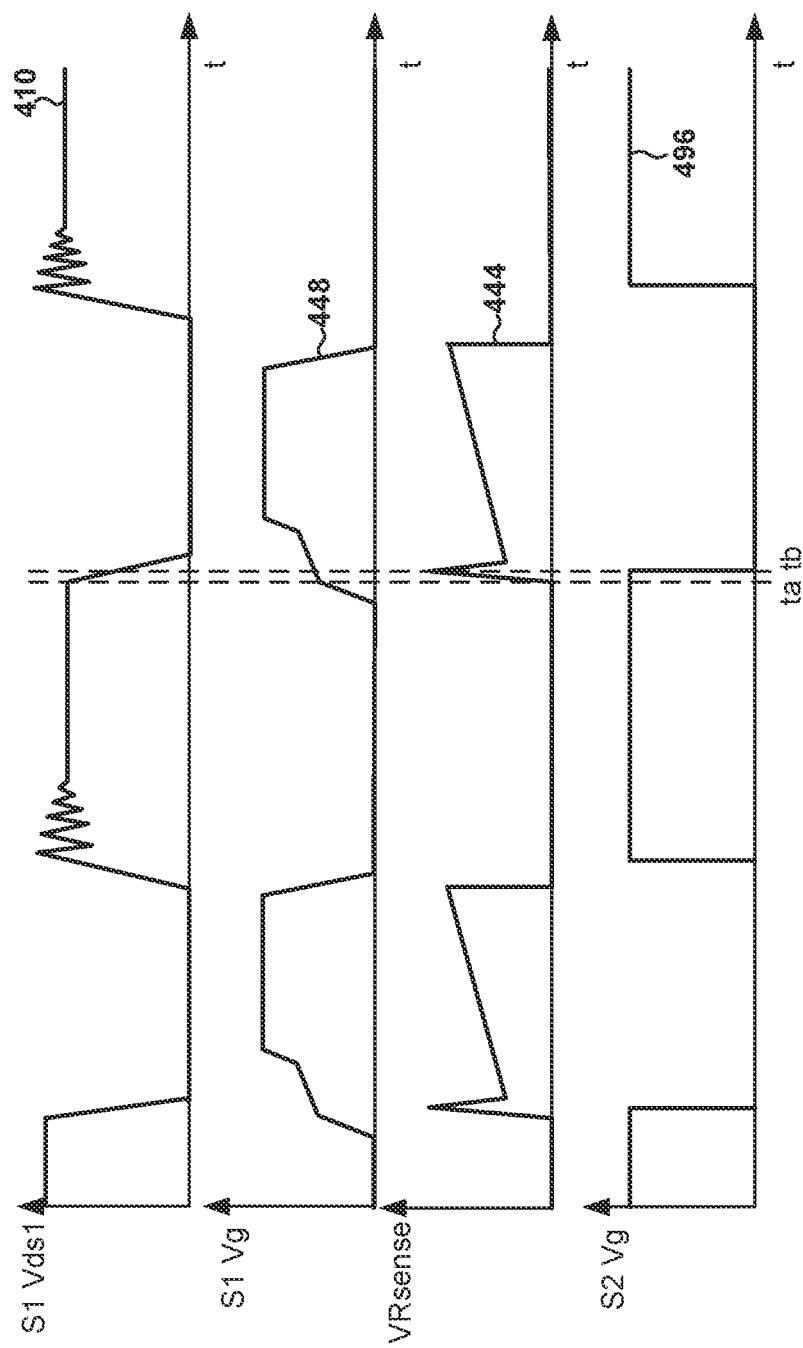
FIG. 4 shows a simplified timing diagram for the conventional switching power supply as shown in FIG. 1 operating in the continuous conduction mode according to some embodiments.

FIG. 4 shows a simplified timing diagram for the conventional switching power supply 100 as shown in FIG. 1 operating in the continuous conduction mode (e.g., the deep continuous conduction mode) according to some embodiments. The waveform 410 represents a voltage difference (e.g., $V_{ds1}$) from the drain terminal 180 to the source terminal 184 of the transistor 170 as a function of time, the waveform 448 represents the drive signal 148 (e.g., a drive voltage) that is received by the gate terminal 182 of the transistor 170 as a function of time, the waveform 444 represents the voltage signal 144 that is generated by the resistor 176 (e.g., $R_{sense}$) as a function of time, and the waveform 496 represents the drive signal 196 (e.g., a drive voltage) that is received by the gate terminal 192 of the transistor 172 as a function of time.

In some examples, at time ta, even though the demagnetization process of the transformer 160 is not yet completed, the transistor 170 is fully turned on as shown by the waveform 448, the voltage difference (e.g., $V_{ds1}$) from the drain terminal 180 to the source terminal 184 of the transistor 170 starts dropping rapidly as shown by the waveform 410, and the transistor 172 remains turned on as shown by the waveform 496. For example, from time $t_a$ to time $t_b$, the transistor 170 remains turned on as shown by the waveform 448, and the transistor 172 also remains turned on as shown by the waveform 496. As an example, at time $t_b$, the SR controller 120 turns off the transistor 172 as shown by the waveform 496, and the transistor 170 remains turned on as shown by the waveform 448.

As shown in FIG. 4, with the switching power supply 100 operating in the continuous conduction mode (e.g., the deep continuous conduction mode), both the transistor 170 and the transistor 172 are turned on from time $t_a$ to time $t_b$ according to certain embodiments. For example, if both the transistor 170 and the transistor 172 are turned on at the same time, the current that flows through the transistor 170 and the current that flows through the transistor 172 can become excessively large, causing the voltage difference (e.g., $V_{ds2}$) from the drain terminal 190 to the source terminal 194 of the transistor 172 to form a high spike in response to the transistor 172 being turned off (e.g., after the transistor 172 becomes turned off). As an example, if the time duration when both the transistor 170 and the transistor 172 are turned on becomes longer, the current that flows through the transistor 170 and the current that flows through the transistor 172 also become larger, causing the voltage difference (e.g., $V_{ds2}$) from the drain terminal 190 to the source terminal 194 of the transistor 172 to form a higher spike when the transistor 172 becomes turned off.

According to some embodiments, the drive signal 148 that is received by the gate terminal 182 of the transistor 170 rises when the transistor 172 is turned on. For example, both the transistor 170 and the transistor 172 are turned on at the same time. As an example, if the rise of the drive signal 148 becomes faster, the current that flows through the transistor 170 also rises faster, the voltage difference from the drain terminal 180 to the source terminal 184 of the transistor 170 also rises faster, and the voltage difference from the drain terminal 190 to the source terminal 194 of the transistor 172 forms a higher spike in response to the transistor 172 being turned off (e.g., after the transistor 172 becomes turned off).

In certain examples, the current that flows through the transistor 170 is determined as follows:

$$I_d = K \times (V_{gs} - V_{th})^2 \qquad \text{(Equation 1)}$$

where $I_d$ represents the current that flows through the transistor 170. Additionally, $V_{gs}$ represents a voltage difference from the gate terminal 182 to the source terminal 184 of the transistor 170, and $V_{th}$ represents a threshold voltage of the transistor 170. Also, K represents a constant that is related to the transistor 170.

In some examples, the voltage signal 144 that is generated by the resistor 176 is determined as follows:

$$V_{Rsense} = I_d \times R_{sense} \qquad \text{(Equation 2)}$$

where $V_{Rsense}$ represents the voltage signal 144 that is generated by the resistor 176. Additionally, $I_d$ represents the current that flows through the transistor 170, and $R_{sense}$ represents the resistance of the resistor 176.

According to some embodiments, to reduce the spike of the voltage difference (e.g., $V_{ds2}$) from the drain terminal 190 to the source terminal 194 of the transistor 172, the time duration when both the transistor 170 and the transistor 172 are turned on needs to be shortened. For example, the time duration needs to be controlled to be shorter than a predetermined threshold (e.g., 20 nanosecond). As an example, the SR controller 120 needs to be able to quickly turn off the transistor 172. In certain examples, to reduce the spike of the voltage difference (e.g., $V_{ds2}$) from the drain terminal 190 to the source terminal 194 of the transistor 172, a current that flows through the primary winding 162 needs to be reduced.

Figure 5:
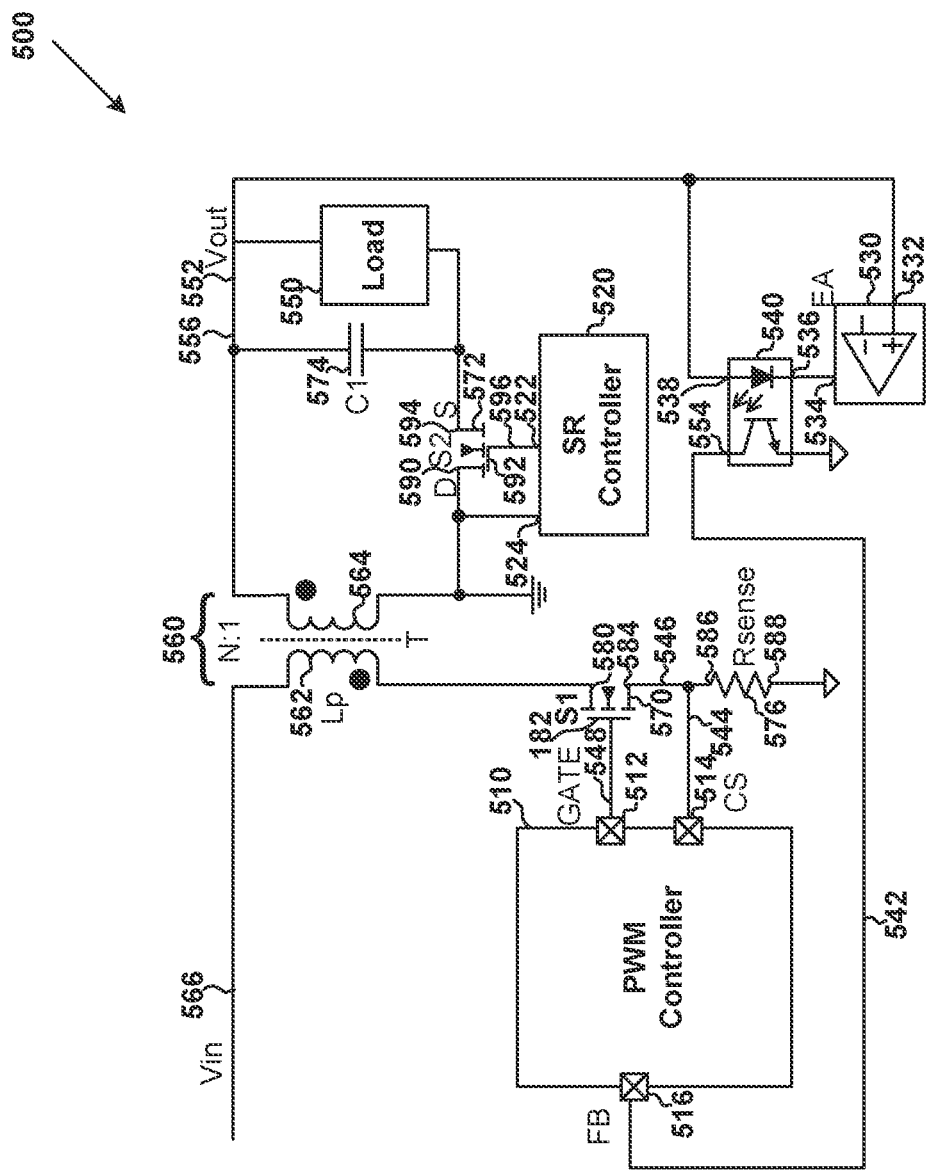
FIG. 5 is a simplified diagram showing a switching power supply according to certain embodiments of the present invention.

FIG. 5 is a simplified diagram showing a switching power supply according to certain embodiments of the present invention. This diagram is merely an example, which should not unduly limit the scope of the claims. One of ordinary skill in the art would recognize many variations, alternatives, and modifications. The switching power supply 500 includes a pulse-width-modulation (PWM) controller 510, a synchronous-rectifier (SR) controller 520, an error amplifier 530, an optocoupler 540, a transformer 560, switches 570 and 572, a capacitor 574, and a resistor 576. In some examples, the transformer 560 includes a primary winding 562 and a secondary winding 564 that is coupled to the primary winding 562. For example, the switch 570 (e.g., a transistor) is on the primary side of the switching power supply 500, and the switch 572 (e.g., a transistor) is on the secondary side of the switching power supply 500. In certain examples, the pulse-width-modulation (PWM) controller 510 is implemented according to FIG. 8 and/or FIG. 9. Although the above has been shown using a selected group of components for the switching power supply 500, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

As shown in FIG. 5, the switching power supply 500 is a flyback switching power supply according to certain embodiments. In some embodiments, the primary winding 562 receives an input voltage 566 (e.g., $V_{in}$), and the switching power supply 500 provides an output voltage 552 (e.g., $V_{out}$) and an output current 556 (e.g., $I_{out}$) to a load 550. In certain examples, the input voltage 566 (e.g., $V_{in}$) is generated from an AC voltage that is received by the switching power supply 500. For example, the input voltage 566 (e.g., $V_{in}$) is generated from the AC voltage through a rectification process performed by a rectification circuit (e.g., a full-wave bridge rectifier) that receives the AC voltage and then through a smoothing process performed by a capacitor that is connected to an output terminal of the rectification circuit, wherein the rectification circuit (e.g., a full-wave bridge rectifier) and the capacitor are parts of the switching power supply 500. In some examples, based at least in part on the input voltage 566 (e.g., $V_{in}$) and/or the output voltage 552 (e.g., $V_{out}$), the switching power supply 500 operates in a critical conduction mode (CRM), a discontinuous conduction mode (DCM), and/or a continuous conduction mode (CCM). As an example, the continuous conduction mode (CCM) includes the deep continuous conduction mode (DCCM).

In certain embodiments, the switch 570 (e.g., a transistor) is connected to the primary winding 562, the resistor 576 (e.g., $R_{sense}$) and the PWM controller 510. For example, the PWM controller 510 controls the closing and/or opening of the switch 570 (e.g., the turning-on and/or turning-off of a transistor). As an example, the switch 572 is connected to the secondary winding 564 of the transformer 560. For example, the SR controller 520 controls the closing and/or opening of the switch 572 (e.g., the turning-on and/or turning-off of a transistor).

In some embodiments, the PWM controller 510 includes a terminal 512 (e.g., GATE), a terminal 514 (e.g., CS), and a terminal 516 (e.g., FB). In certain examples, the terminal 516 (e.g., FB) receives a feedback signal 542 (e.g., a feedback voltage), which is generated by the error amplifier 530 and the optocoupler 540. For example, the feedback signal 542 represents the output voltage 552 (e.g., $V_{out}$), which is received by the load 550. In some examples, the terminal 514 (e.g., CS) receives a voltage signal 544, which is generated by the resistor 576 (e.g., $R_{sense}$). For example, the voltage signal 544 represents a current 546 that flows through the resistor 576 (e.g., $R_{sense}$) from the primary winding 562. In certain examples, the terminal 512 (e.g., GATE) outputs a drive signal 548 (e.g., a drive voltage) to the switch 570 (e.g., a transistor) to control the closing and/or opening of the switch 570 (e.g., the turning-on and/or turning-off of a transistor).

According to certain embodiments, the transistor 570 includes a drain terminal 580, a gate terminal 582, and a source terminal 584, and the resistor 576 (e.g., $R_{sense}$) includes a terminal 586 and a terminal 588. For example, the drain terminal 580 is connected to the primary winding 562, and the gate terminal 582 receives the drive signal 548 from the terminal 512 (e.g., GATE). As an example, the source terminal 584 is connected to the terminal 586, and the terminal 588 is biased to a ground voltage. For example, the terminal 514 (e.g., CS) receives the voltage signal 544 from the source terminal 584 of the transistor 570 and the terminal 586 of the resistor 576 (e.g., $R_{sense}$).

According to some embodiments, the SR controller 520 includes an output terminal 522 and an input terminal 524. In certain examples, the transistor 572 includes a drain terminal 590, a gate terminal 592, and a source terminal 594. For example, the drain terminal 590 is connected to the input terminal 524 of the SR controller 520, and the gate terminal 592 is connected to the output terminal 522 of the SR controller 520. In some examples, the output terminal 522 of the SR controller 520 sends a drive signal 596 (e.g., a drive voltage) to the gate terminal 592 of the transistor 572.

According to certain embodiments, the error amplifier 530 includes an input terminal 532 and an output terminal 534, and the optocoupler 540 includes input terminals 536 and 538 and an output terminal 554. For example, the output voltage 552 (e.g., $V_{out}$) is received by the input terminal 532 of the error amplifier 530 and the input terminal 538 of the optocoupler 540. As shown in FIG. 5, the output terminal 534 of the error amplifier 530 is connected to the input terminal 536 of the optocoupler 540, and the output terminal 554 of the optocoupler 540 is connected to the terminal 516 (e.g., FB) of the PWM controller 510 according to some embodiments. For example, the terminal 516 (e.g., FB) receives the feedback signal 542 from the output terminal 554 of the optocoupler 540.

Figure 7:
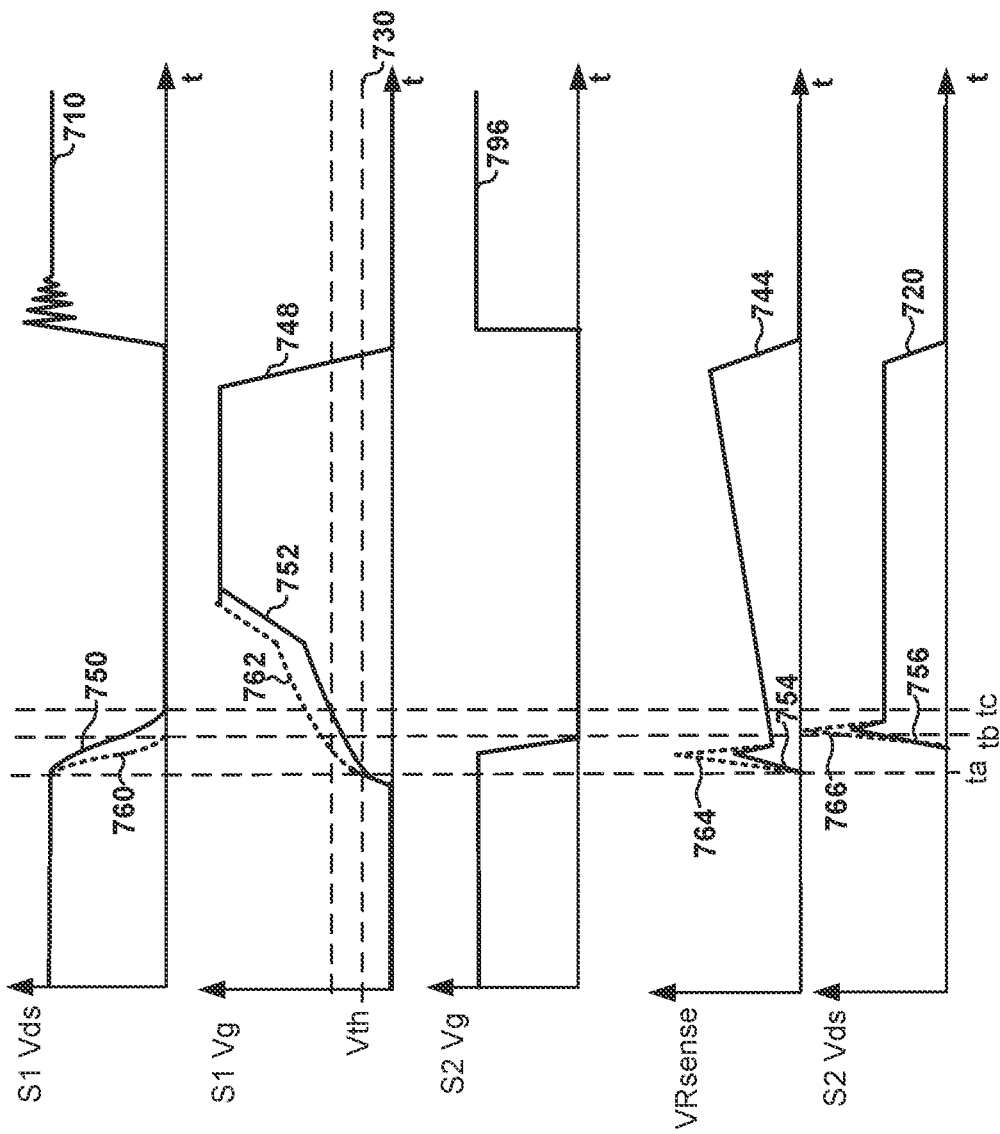
FIG. 7 shows a simplified timing diagram for the switching power supply as shown in FIG. 5 that operates in the continuous conduction mode according to certain embodiments of the present invention.
Figure 8:
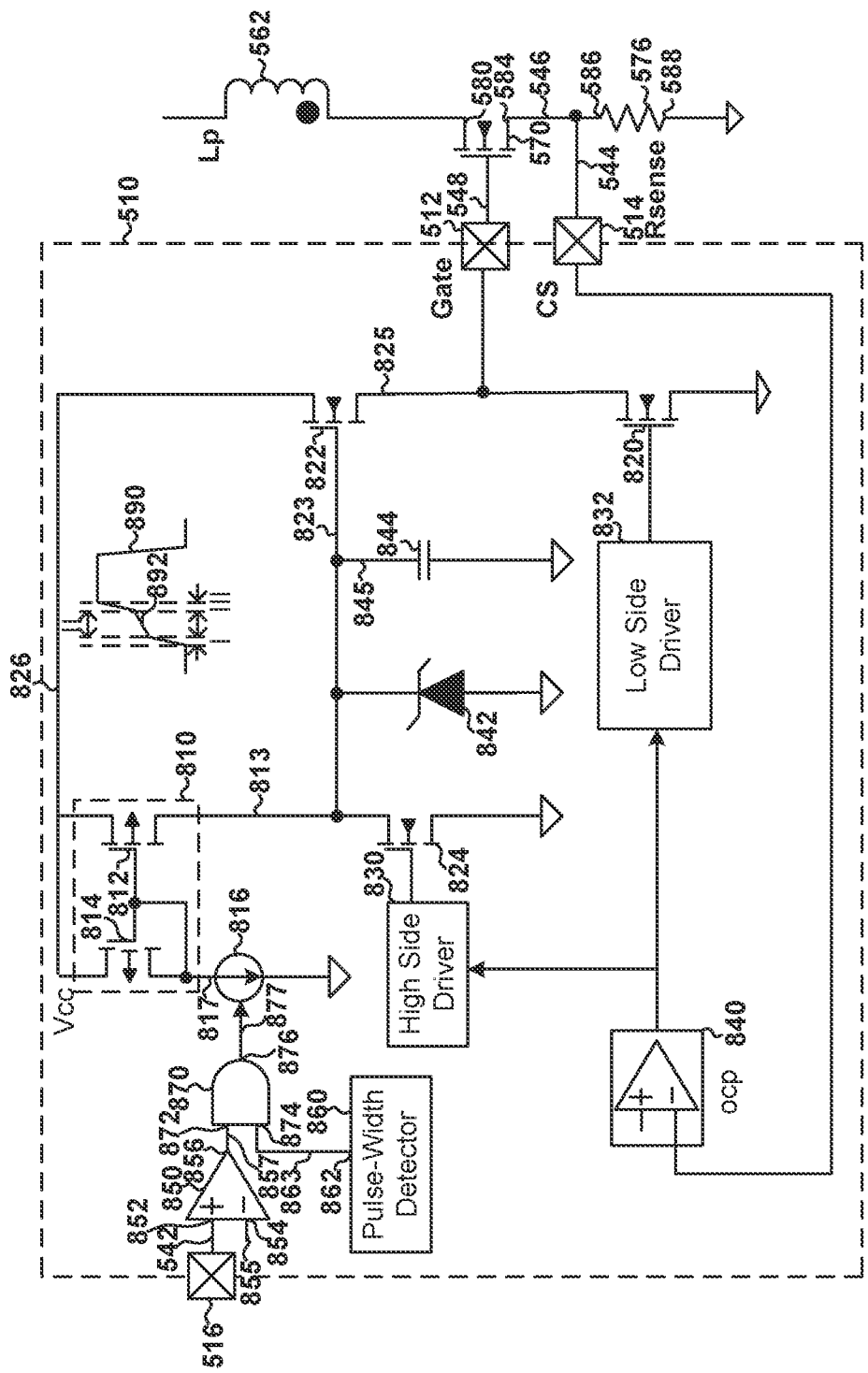
FIG. 8 is a simplified diagram showing the pulse-width-modulation (PWM) controller as part of the switching power supply as shown in FIG. 5 according to certain embodiments of the present invention.

In some embodiments, the pulse-width-modulation (PWM) controller 510 is implemented according to FIG. 8. In certain examples, the pulse-width-modulation (PWM) controller 510 receives the feedback signal 542 from the output terminal 554 of the optocoupler 540 and detects the pulse width of the drive signal 548 that is received by the gate terminal 582 of the transistor 570. In some examples, the pulse-width-modulation (PWM) controller 510 uses the feedback signal 542 and the most-recently detected pulse width to determine how fast the drive signal 548 rises. For example, the pulse-width-modulation (PWM) controller 510 uses the feedback signal 542 and the detected pulse width during switching cycle A to determine how fast the drive signal 548 rises in switching cycle B, wherein the switching cycle B follows immediately the switching cycle A, as shown in FIG. 6 and/or FIG. 7.

Figure 9:
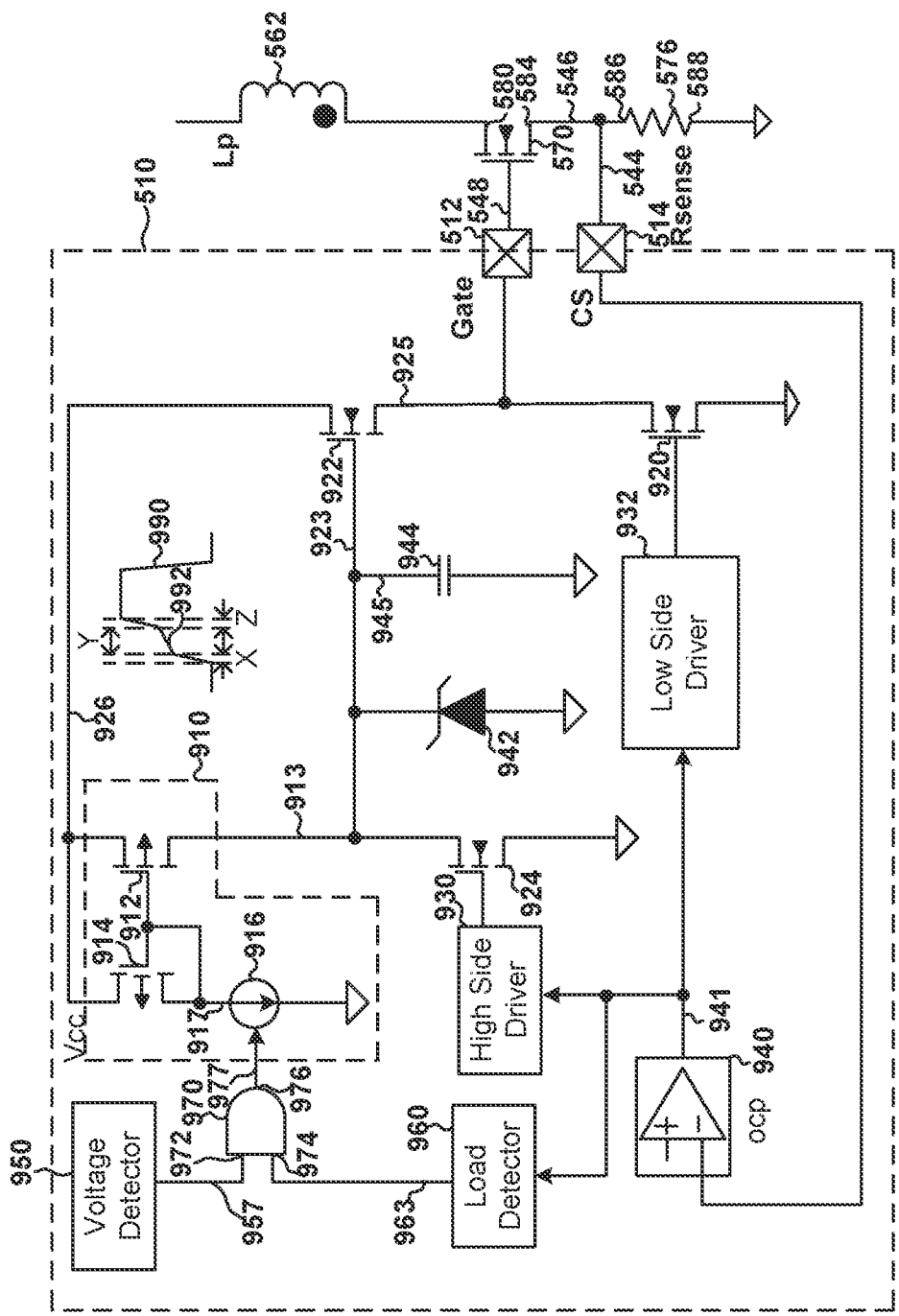
FIG. 9 is a simplified diagram showing the pulse-width-modulation (PWM) controller as part of the switching power supply as shown in FIG. 5 according to some embodiments of the present invention.

In certain embodiments, the pulse-width-modulation (PWM) controller 510 is implemented according to FIG. 9. In some examples, the pulse-width-modulation (PWM) controller 510 detects the input voltage 566 (e.g., $V_{in}$) and receives the voltage signal 544 generated by the resistor 576 (e.g., $R_{sense}$). In certain examples, the pulse-width-modulation (PWM) controller 510 uses the detected input voltage 566 (e.g., $V_{in}$) and the received voltage signal 544 to determine how fast the drive signal 548 rises.

Figure 6:
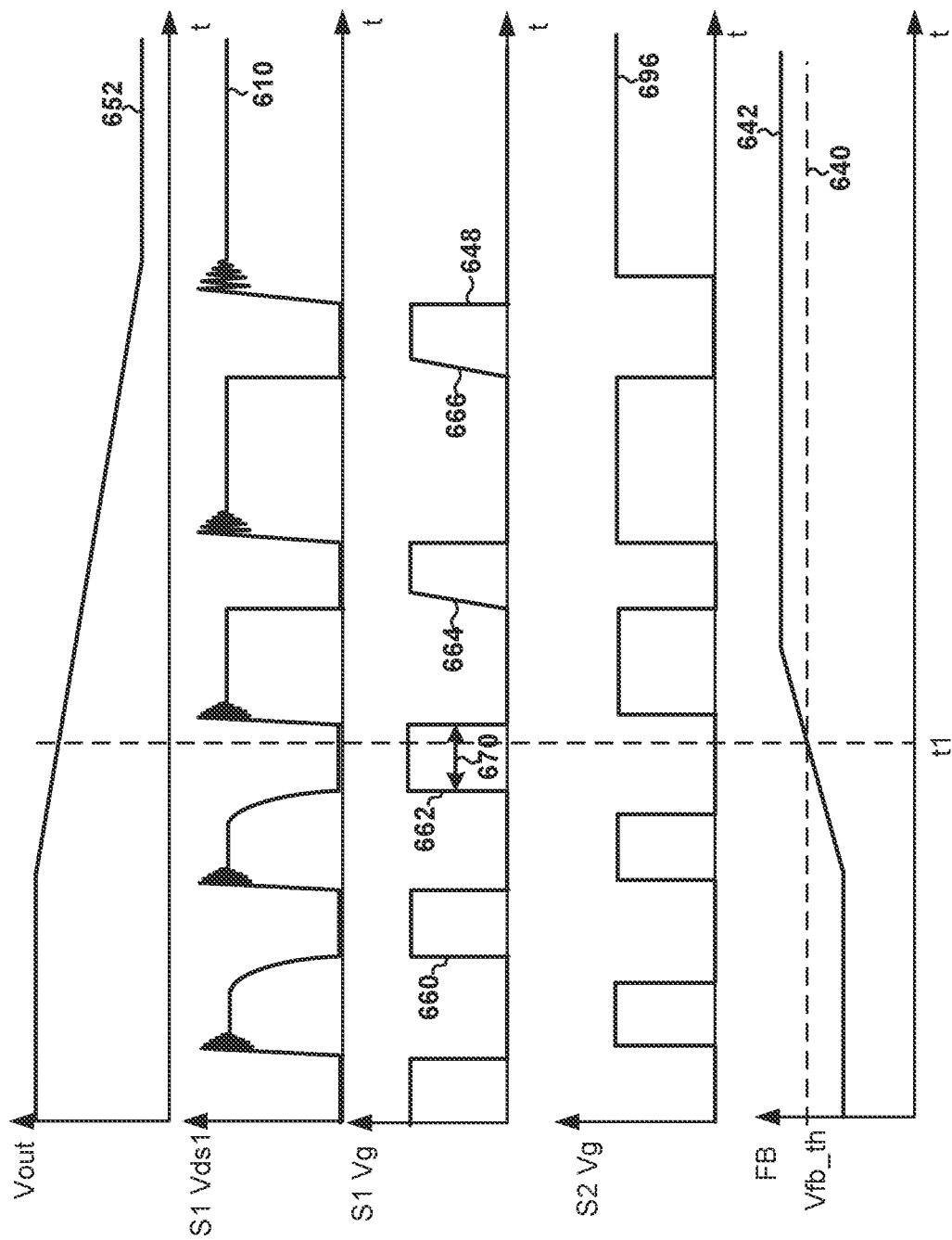
FIG. 6 shows a simplified timing diagram for the switching power supply 500 as shown in FIG. 5 that changes from operating in the discontinuous conduction mode to operating in the continuous conduction mode according to some embodiments of the present invention.

FIG. 6 shows a simplified timing diagram for the switching power supply 500 as shown in FIG. 5 that changes from operating in the discontinuous conduction mode to operating in the continuous conduction mode (e.g., the deep continuous conduction mode) according to some embodiments of the present invention. This diagram is merely an example, which should not unduly limit the scope of the claims. One of ordinary skill in the art would recognize many variations, alternatives, and modifications. The waveform 652 represents the output voltage 552 (e.g., $V_{out}$) as a function of time, the waveform 610 represents a voltage difference (e.g., $V_{ds1}$) from the drain terminal 580 to the source terminal 584 of the transistor 570 as a function of time, the waveform 648 represents the drive signal 548 (e.g., a drive voltage) that is received by the gate terminal 582 of the transistor 570 as a function of time, the waveform 696 represents the drive signal 596 (e.g., a drive voltage) that is received by the gate terminal 592 of the transistor 572 as a function of time, and the waveform 642 represents the feedback signal 542 as a function of time.

As shown by the waveform 642, the feedback signal 542 becomes larger than a predetermined feedback threshold 640 (e.g., $V_{fb\_th}$) at time $t_1$ according to certain embodiments. For example, at time $t_1$, the output voltage 552 (e.g., $V_{out}$) decreases with time as shown by the waveform 652. As an example, if the feedback signal 542 becomes larger than the predetermined feedback threshold 640 (e.g., $V_{fb\_th}$) and the previous pulse width (e.g., a pulse width 670) of the drive signal 548 that is received by the gate terminal 582 of the transistor 570 becomes smaller than a width threshold, the switching power supply 500 changes from operating in the discontinuous conduction mode to operating in the continuous conduction mode (e.g., the deep continuous conduction mode).

According to some embodiments, at rising edges of the drive signal 548 that is received by the gate terminal 582 of the transistor 570, the drive signal 548 increases more slowly in the continuous conduction mode (e.g., the deep continuous conduction mode) than in the discontinuous conduction mode as shown by the waveform 648. For example, the drive signal 548 includes rising edges 660 and 662 in the discontinuous conduction mode and also includes rising edges 664 and 666 in the continuous conduction mode (e.g., the deep continuous conduction mode). As an example, the drive signal 548 increases faster at the rising edges 660 and 662 in the discontinuous conduction mode than at the rising edges 664 and 666 in the continuous conduction mode (e.g., the deep continuous conduction mode).

According to certain embodiments, the drive signal 548 increases more slowly at rising edges in the continuous conduction mode (e.g., the deep continuous conduction mode) than at rising edges in the discontinuous conduction mode. For example, making the drive signal 548 increase more slowly in the continuous conduction mode (e.g., the deep continuous conduction mode) than in the discontinuous conduction mode reduces a current that flows through the switch 570 (e.g., a transistor) and a current that flows through the switch 572 (e.g., a transistor) when both the switch 570 (e.g., a transistor) and the switch 572 (e.g., a transistor) are closed (e.g., turned on), significantly reducing (e.g., lowering) a spike in magnitude that is formed by a voltage difference (e.g., $V_{ds2}$) from the drain terminal 590 to the source terminal 594 of the transistor 572.

FIG. 7 shows a simplified timing diagram for the switching power supply 500 as shown in FIG. 5 that operates in the continuous conduction mode (e.g., the deep continuous conduction mode) according to certain embodiments of the present invention. This diagram is merely an example, which should not unduly limit the scope of the claims. One of ordinary skill in the art would recognize many variations, alternatives, and modifications. The waveform 710 represents the voltage difference (e.g., $V_{ds1}$) from the drain terminal 580 to the source terminal 584 of the transistor 570 as a function of time, the waveform 748 represents the drive signal 548 (e.g., a drive voltage) that is received by the gate terminal 582 of the transistor 570 as a function of time, the waveform 796 represents the drive signal 596 (e.g., a drive voltage) that is received by the gate terminal 592 of the transistor 572 as a function of time, the waveform 744 represents the voltage signal 544 that is generated by the resistor 576 (e.g., $R_{sense}$) as a function of time, and the waveform 720 represents the voltage difference (e.g., $V_{ds2}$) from the drain terminal 590 to the source terminal 594 of the transistor 572 as a function of time.

In some examples, the waveform 710 includes a falling edge 750 but does not include a falling edge 760 represented by a dashed line, the waveform 748 includes a rising edge 752 but does not include a rising edge 762 represented by a dashed line, the waveform 744 includes a spike 754 but does not include a spike 764 represented by a dashed line, the waveform 720 includes a spike 756 but does not include a spike 766 represented by a dashed line. In certain examples, the falling edge 760 represented by a dashed line, the rising edge 762 represented by a dashed line, the spike 764 represented by a dashed line, and the spike 766 represented by a dashed line are provided to describe the operation of the switching power supply 100, where, at rising edges of the drive signal 148 that is received by the gate terminal 182 of the transistor 170, the drive signal 148 increases as rapidly in the continuous conduction mode (e.g., the deep continuous conduction mode) as in the discontinuous conduction mode. In some examples, the drive signal 196 that is received by the gate terminal 192 of the transistor 172 as a function of time is at least partially different from the waveform 796 that represents the drive signal 596 as a function of time.

For example, in the continuous conduction mode (e.g., the deep continuous conduction mode), the drive signal 548 that is received by the gate terminal 582 of the transistor 570 rises more slowly than the drive signal 148 that is received by the gate terminal 182 of the transistor 170 as shown by the rising edge 752 and the rising edge 762 represented by a dashed line. As an example, in the continuous conduction mode (e.g., the deep continuous conduction mode), the voltage difference from the drain terminal 580 to the source terminal 584 of the transistor 570 decreases more slowly than the voltage difference from the drain terminal 180 to the source terminal 184 of the transistor 170 as shown by the falling edge 750 and the falling edge 760 represented by a dashed line. For example, in the continuous conduction mode (e.g., the deep continuous conduction mode), the voltage signal 544 that is generated by the resistor 576 forms a lower spike than the voltage signal 144 that is generated by the resistor 176 as shown by the spike 754 and the spike 764 represented by a dashed line. As an example, in the continuous conduction mode (e.g., the deep continuous conduction mode), the voltage difference from the drain terminal 590 to the source terminal 594 of the transistor 572 forms a lower spike than the voltage difference from the drain terminal 190 to the source terminal 194 of the transistor 172 as shown by the spike 756 and the spike 766 represented by a dashed line.

As shown in FIG. 7, at time $t_a$, the drive signal 548 that is received by the gate terminal 582 of the transistor 570 rises to a voltage threshold 730 (e.g., $V_{th}$) as shown by the waveform 748, and the transistor 570 becomes turned on according to certain embodiments.

FIG. 8 is a simplified diagram showing the pulse-width-modulation (PWM) controller 510 as part of the switching power supply 500 as shown in FIG. 5 according to certain embodiments of the present invention. This diagram is merely an example, which should not unduly limit the scope of the claims. One of ordinary skill in the art would recognize many variations, alternatives, and modifications. The PWM controller 510 includes a current mirror 810, a current source 816, a transistor 820 (e.g., an NMOS transistor), a transistor 822 (e.g., an NMOS transistor), a transistor 824 (e.g., an NMOS transistor), a high-side driver 830, a low-side driver 832, an over-current-protection comparator 840, a Zener diode 842, a capacitor 844, a comparator 850, a pulse-width detector 860, and an AND gate 870. For example, the current mirror 810 includes a transistor 812 (e.g., a PMOS transistor) and a transistor 814 (e.g., a PMOS transistor). As an example, the transistor 820 (e.g., an NMOS transistor), the transistor 822 (e.g., an NMOS transistor), the transistor 824 (e.g., an NMOS transistor), the high-side driver 830, the low-side driver 832, the Zener diode 842, and the capacitor 844 are parts of a drive voltage generator that generates the drive voltage 548. Although the above has been shown using a selected group of components for the pulse-width-modulation (PWM) controller 510, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

As shown in FIG. 8, a drain terminal of the transistor 824 is connected to an output terminal of the current mirror 810, and a source terminal of the transistor 824 is biased to a ground voltage according to some embodiments. For example, a gate terminal of the transistor 824 is connected to an output terminal of the high-side driver 830, and an input terminal of the high-side driver 830 is connected to an output terminal of the over-current-protection comparator 840. As an example, the output terminal of the over-current-protection comparator 840 is connected to an input terminal of the low-side driver 832. For example, an input terminal of the over-current-protection comparator 840 is connected, through the terminal 514 (e.g., CS), to the source terminal 584 of the transistor 570 and the terminal 586 of the resistor 576. As an example, another input terminal of the over-current-protection comparator 840 receives a predetermined reference voltage.

In certain embodiments, an output terminal of the low-side driver 832 is connected to a gate terminal of the transistor 820. For example, a drain terminal of the transistor 822 receives a voltage 826 (e.g., $V_{cc}$), a source terminal of the transistor 822 is connected to a drain terminal of the transistor 820, and a source terminal of the transistor 820 is biased to a ground voltage. As an example, a gate terminal of the transistor 822 is connected to the drain terminal of the transistor 824, one terminal of the Zener diode 842, and one terminal of the capacitor 844. For example, another terminal of the Zener diode 842 is biased to the ground voltage, and another terminal of the capacitor 844 is also biased to the ground voltage.

In some examples, if the transistor 820 is turned on and the transistor 822 is turned off, the drive signal 548 is at a logic low level and the transistor 570 is turned off. In certain examples, if the transistor 820 is turned off and the transistor 822 is turned on, the drive signal 548 is at a logic high level and the transistor 570 is turned on. For example, the source terminal of the transistor 822 is connected to the terminal 512 (e.g., GATE) and the gate terminal of the transistor 822 is connected to the transistor 812 and the transistor 824, forming a drive component of the PWM controller 510. As an example, the maximum value of the voltage at the gate terminal of the transistor 822 is limited by the Zener diode 842 in order to control the maximum value of the voltage at the terminal 512 (e.g., GATE).

According to some embodiments, the comparator 850 includes an input terminal 852, an input terminal 854, and an output terminal 856. In certain examples, the input terminal 852 (e.g., the "+" terminal) of the comparator 850 receives the feedback signal 542 through the terminal 516 (e.g., FB). For example, the feedback signal 542 represents the output voltage 552 (e.g., $V_{out}$). In some examples, the input terminal 854 (e.g., the "−" terminal) of the comparator 850 receives a predetermined feedback threshold 855 (e.g., $V_{fb\_th}$). In certain examples, the output terminal 856 of the comparator 850 sends a comparison signal 857. For example, if the feedback signal 542 becomes larger than the predetermined feedback threshold 855 (e.g., $V_{fb\_th}$), the comparison signal 857 changes from a logic low level to a logic high level.

According to certain embodiments, the pulse-width detector 860 includes an output terminal 862. In some examples, the pulse-width detector 860 detects the most-recent pulse width of the drive signal 548 and compares the detected pulse width of the drive signal 548 with a predetermined time threshold (e.g., $T_{on\_th}$). For example, the detected pulse width represents the duration of the on-period of the transistor 570 for the most-recent switching cycle. As an example, during the on-period, the drive signal 548 is at the logic high level, and the transistor 570 remains turned on. In certain examples, the output terminal 862 of the pulse-width detector 860 sends a detection signal 863. For example, if the detected pulse width of the drive signal 548 becomes smaller than the predetermined time threshold (e.g., $T_{on\_th}$), the detection signal 863 changes from the logic low level to the logic high level.

According to some embodiments, the AND gate 870 includes an input terminal 872, an input terminal 874, and an output terminal 876. For example, the AND gate 870 is used as a control signal generator. In certain examples, the input terminal 872 receives the comparison signal 857, and the input terminal 874 receives the detection signal 863. In some examples, the output terminal 876 sends a control signal 877. For example, if both the comparison signal 857 and the detection signal 863 are at the logic high level, the control signal 877 is the at the logic high level, and if the comparison signal 857 and/or the detection signal 863 is at the logic low level, the control signal 877 is at the logic low level. As an example, if the control signal 877 changes from the logic low level to the logic high level, the switching power supply 500 changes from the discontinuous conduction mode to the continuous conduction mode (e.g., the deep continuous conduction mode).

According to certain embodiments, the current source 816 receives the control signal 877 and generates a current 817 based at least in part on the control signal 877. In some examples, if the control signal 877 is at the logic low level, the current source 816 generates the current 817 at a predetermined higher magnitude, and if the control signal 877 is at the logic high level, the current source 816 generates the current 817 at a predetermined lower magnitude. For example, if the control signal 877 changes from the logic low level to the logic high level, the current 817 decreases from the predetermined higher magnitude to the predetermined lower magnitude. As an example, if the control signal 877 changers from the logic high level to the logic low level, the current 817 increases from the predetermined lower magnitude to the predetermined higher magnitude.

In some embodiments, the current mirror 810 uses the current 817 to generate an output current 813. For example, the output current 813 is equal to the current 817 multiplied by a predetermined constant. In certain examples, if the current 817 generated by the current source 816 decreases, an output current 813 of the current mirror 810 also decreases. For example, if the output current 813 of the current mirror 810 decreases, a current 845 that charges the capacitor 844 also decreases. As an example, if the current 845 that charges the capacitor 844 decreases, the rate of increase of a drive signal 823 that is received by a gate terminal of the transistor 822 also decreases. For example, if the rate of increase of the drive signal 823 decreases, the rate of increase of a source voltage 825 at a source terminal of the transistor 822 also decreases. As an example, if the rate of increase of the source voltage 825 decreases, the rate of increase of the drive signal 548 that is received by the gate terminal 582 of the transistor 570 also decreases.

In certain embodiments, the pulse-width-modulation (PWM) controller 510 receives the feedback signal 542 from the output terminal 554 of the optocoupler 540 and detects the pulse width of the drive signal 548 that is received by the gate terminal 582 of the transistor 570. For example, the pulse-width-modulation (PWM) controller 510 uses the feedback signal 542 and the most-recently detected pulse width to determine how fast the drive signal 823 that is received by the gate terminal of the transistor 822 rises and to control how fast drive signal 548 rises based at least in part on the rate of increase of the drive signal 823. As an example, the pulse-width-modulation (PWM) controller 510 uses the feedback signal 542 and the detected pulse width during switching cycle A to determine how fast the drive signal 548 rises in switching cycle B, wherein the switching cycle B follows immediately the switching cycle A, as shown in FIG. 6 and/or FIG. 7. For example, as shown in FIG. 6, the predetermined feedback threshold 855 is the same as the predetermined feedback threshold 640.

According to some embodiments, if the control signal 877 changes from the logic low level to the logic high level, the current 817 generated by the current source 816 decreases. For example, if the feedback signal 542 becomes larger than the predetermined feedback threshold 855 (e.g., $V_{fb\_th}$) and the detected pulse width of the drive signal 548 becomes smaller than the predetermined time threshold (e.g., $T_{on\_th}$), the current 817 generated by the current source 816 decreases from the predetermined higher magnitude to the predetermined lower magnitude.

According to certain embodiments, the feedback signal 542 is larger than the predetermined feedback threshold 855 (e.g., $V_{fb\_th}$) and the detected pulse width of the drive signal 548 is smaller than the predetermined time threshold (e.g., $T_{on\_th}$) when the input voltage 566 (e.g., $V_{in}$) is high and the output current 556 (e.g., $I_{out}$) is also high. For example, with the same output current 556 (e.g., $I_{out}$), if the input voltage 566 (e.g., $V_{in}$) becomes higher, the pulse width of the drive signal 548 that is received by the gate terminal 582 of the transistor 570 becomes smaller. As an example, when the feedback signal 542 becomes larger than the predetermined feedback threshold 855 (e.g., $V_{fb\_th}$), if the pulse width of the drive signal 548 becomes smaller than the predetermined time threshold (e.g., $T_{on\_th}$), the control signal 877 changes from the logic low level to the logic high level, reducing the rate of increase of the drive signal 548 that is received by the gate terminal 582 of the transistor 570 and also lowering the spike formed by the voltage difference (e.g., $V_{ds2}$) from the drain terminal 590 to the source terminal 594 of the transistor 572 in response to the transistor 572 being turned off (e.g., after the transistor 572 becomes turned off).

In some embodiments, the feedback signal 542 is larger than the predetermined feedback threshold 855 (e.g., $V_{fb\_th}$) and the detected pulse width of the drive signal 548 is smaller than the predetermined time threshold (e.g., $T_{on\_th}$) when the switching power supply 500 is in the start-up process. In certain embodiments, the feedback signal 542 is larger than the predetermined feedback threshold 855 (e.g., $V_{fb\_th}$) and the detected pulse width of the drive signal 548 is smaller than the predetermined time threshold (e.g., $T_{on\_th}$) when the switching power supply 500 is under an output short-circuit condition. For example, under the output short-circuit condition, a positive output terminal and a negative output terminal of the switching power supply 500 are directly or approximately shorted together due to one or more external reasons. As an example, under the output short-circuit condition, the switching power supply 500 operates in the continuous conduction mode (e.g., the deep continuous conduction mode). In some embodiments, the feedback signal 542 is larger than the predetermined feedback threshold 855 (e.g., $V_{fb\_th}$) and the detected pulse width of the drive signal 548 is smaller than the predetermined time threshold (e.g., $T_{on\_th}$) when the switching power supply 500 is under an output overload condition. For example, under the output overload condition, the output current 556 (e.g., $I_{out}$) is excessively high.

In certain embodiments, the voltage value of the drive signal 548 increases in three stages I, II, and III as shown in FIG. 8. For example, the waveform 890 represents the drive signal 823 (e.g., the voltage 823) at the gate terminal of the transistor 822 as a function of time if the control signal 877 is at the logic high level. As an example, the waveform 892 represents the drive signal 823 (e.g., the voltage 823) at the gate terminal of the transistor 822 as a function of time if the control signal 877 is at the logic low level.

In certain examples, as shown by the waveform 890, during the stage I, when the voltage value of the drive signal 548 is lower than the threshold voltage (e.g., $V_{th}$) of the transistor 570 and the transistor 570 is in an off state, the drive signal 823 (e.g., the voltage 823) at the gate terminal of the transistor 822 rises rapidly. In some examples, as shown by the waveform 890, during the stage II, the drive signal 823 (e.g., the voltage 823) at the gate terminal of the transistor 822 rises less rapidly than during the stage I in order to reduce the electromagnetic interference (EMI). In certain examples, as shown by the waveform 890, during the stage III, when the transistor 570 is fully turned on, the drive signal 823 (e.g., the voltage 823) at the gate terminal of the transistor 822 rises more rapidly than during the stage II, in order to reduce the switching loss of the transistor 570 and improve the efficiency of the switching power supply 500.

In some examples, the waveforms 890 and 892 show certain differences in the drive signal 823 (e.g., the voltage 823) as a function of time between when the control signal 877 is at the logic high level and the control signal 877 is at the logic low level. For example, during the stage I, when the control signal 877 is at the logic high level, the drive signal 823 (e.g., the voltage 823) rises as rapidly as when the control signal 877 is at the logic low level. As an example, during the stage II, when the control signal 877 is at the logic high level, the drive signal 823 (e.g., the voltage 823) rises more slowly as when the control signal 877 is at the logic low level. For example, during the stage III, when the control signal 877 is at the logic high level, the drive signal 823 (e.g., the voltage 823) rises as rapidly as when the control signal 877 is at the logic low level.

As shown in FIG. 8, when the control signal 877 is at the logic high level, the drive signal 548 (e.g., the voltage 548) that is received by the gate terminal 582 of the transistor 570 rises more slowly than when the control signal 877 is at the logic low level according to certain embodiments. For example, when the control signal 877 is at the logic high level, the drive signal 548 (e.g., the voltage 548) rises at a rate of change (e.g., a rate of increase) that is smaller than when the control signal 877 is at the logic low level. As an example, when the control signal 877 remains at the same logic high level, the rate of change (e.g., a rate of increase) for the drive signal 548 (e.g., the voltage 548) changes with time.

According to some embodiments, if the drive signal 548 (e.g., the voltage 548) rises more slowly, the current 546 that flows through the transistor 570 is reduced when the transistor 570 starts being turned on. For example, if the drive signal 548 (e.g., the voltage 548) rises more slowly, the voltage difference (e.g., $V_{ds1}$) from the drain terminal 580 to the source terminal 584 of the transistor 570 decreases more slowly. As an example, if the drive signal 548 (e.g., the voltage 548) rises more slowly, the spike formed by the voltage difference (e.g., $V_{ds2}$) from the drain terminal 590 to the source terminal 594 of the transistor 572 is also reduced (e.g., lowered).

FIG. 9 is a simplified diagram showing the pulse-width-modulation (PWM) controller 510 as part of the switching power supply 500 as shown in FIG. 5 according to some embodiments of the present invention. This diagram is merely an example, which should not unduly limit the scope of the claims. One of ordinary skill in the art would recognize many variations, alternatives, and modifications. The PWM controller 510 includes a current mirror 910, a current source 916, a transistor 920 (e.g., an NMOS transistor), a transistor 922 (e.g., an NMOS transistor), and a transistor 924 (e.g., an NMOS transistor), a high-side driver 930, a low-side driver 932, an over-current-protection comparator 940, a Zener diode 942, a capacitor 944, a voltage detector 950, a load detector 960, and an AND gate 970. For example, the current mirror 910 includes a transistor 912 (e.g., a PMOS transistor) and a transistor 914 (e.g., a PMOS transistor). As an example, the transistor 920 (e.g., an NMOS transistor), the transistor 922 (e.g., an NMOS transistor), the transistor 924 (e.g., an NMOS transistor), the high-side driver 930, the low-side driver 932, the Zener diode 942, and the capacitor 944 are parts of a drive voltage generator that generates the drive voltage 548. Although the above has been shown using a selected group of components for the pulse-width-modulation (PWM) controller 510, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

As shown in FIG. 9, a drain terminal of the transistor 924 is connected to an output terminal of the current mirror 910, and a source terminal of the transistor 924 is biased to a ground voltage according to some embodiments. For example, a gate terminal of the transistor 924 is connected to an output terminal of the high-side driver 930, and an input terminal of the high-side driver 930 is connected to an output terminal of the over-current-protection comparator 940. As an example, the output terminal of the over-current-protection comparator 940 is connected to an input terminal of the low-side driver 930. In certain examples, an input terminal (e.g., the "−" terminal) of the over-current-protection comparator 940 is connected, through the terminal 514 (e.g., CS), to the source terminal 584 of the transistor 570 and the terminal 586 of the resistor 576. For example, the input terminal (e.g., the "−" terminal) of the over-current-protection comparator 940 receives the voltage signal 544, which represents the current 546 that flows through the resistor 576 (e.g., $R_{sense}$) from the primary winding 562. As an example, another input terminal (e.g., the "+" terminal) of the over-current-protection comparator 940 receives a predetermined reference voltage. In some examples, the over-current-protection comparator 940 generates a comparison signal 941. For example, the comparison signal 941 is received by the high-side driver 930 and the low-side driver 932. As an example, the comparison signal 941 is received by the load detector 960.

In certain embodiments, an output terminal of the low-side driver 932 is connected to a gate terminal of the transistor 920. For example, a drain terminal of the transistor 922 receives a voltage 926 (e.g., $V_{cc}$), a source terminal of the transistor 922 is connected to a drain terminal of the transistor 920, and a source terminal of the transistor 920 is biased to a ground voltage. As an example, a gate terminal of the transistor 922 is connected to the drain terminal of the transistor 924, one terminal of the Zener diode 942, and one terminal of the capacitor 944. For example, another terminal of the Zener diode 942 is biased to the ground voltage, and another terminal of the capacitor 944 is also biased to the ground voltage.

In some examples, if the transistor 920 is turned on and the transistor 922 is turned off, the drive signal 548 is at a logic low level and the transistor 570 is turned off. In certain examples, if the transistor 920 is turned off and the transistor 922 is turned on, the drive signal 548 is at a logic high level and the transistor 570 is turned on. For example, the source terminal of the transistor 922 is connected to the terminal 512 (e.g., GATE) and the gate terminal of the transistor 922 is connected to the transistor 912 and the transistor 924, forming a drive component of the PWM controller 510. As an example, the maximum value of the voltage at the gate terminal of the transistor 922 is limited by the Zener diode 942 in order to control the maximum value of the voltage at the terminal 512 (e.g., GATE).

According to some embodiments, the input voltage 566 (e.g., $V_{in}$) is generated from an AC voltage through a rectification process performed by a rectification circuit (e.g., a full-wave bridge rectifier) that receives the AC voltage and then through a smoothing process performed by a capacitor that is connected to an output terminal of the rectification circuit. In certain examples, the voltage detector 950 determines whether the peak magnitude of the AC voltage exceeds a predetermined voltage threshold. For example, the voltage detector 950 generates a voltage detection signal 957. As an example, if the peak magnitude of the AC voltage becomes larger than the predetermined voltage threshold, the voltage detection signal 957 changes from a logic low level to a logic high level.

According to certain embodiments, the voltage detector 950 determines whether the peak magnitude of the AC voltage exceeds the predetermined voltage threshold by comparing the input voltage 566 (e.g., $V_{in}$) with an input voltage threshold. For example, if the input voltage 566 (e.g., $V_{in}$) is larger than the input voltage threshold, the peak magnitude of the AC voltage exceeds the predetermined voltage threshold. As an example, if the input voltage 566 (e.g., $V_{in}$) is not larger than the input voltage threshold, the peak magnitude of the AC voltage does not exceed the predetermined voltage threshold.

In some embodiments, the load detector 960 receives the comparison signal 941 from the over-current-protection comparator 940. For example, the load detector 960 generates a load detection signal 963. As an example, if the load (e.g., the output current 556) becomes larger than a predetermined load threshold, the load detection signal 963 changes from a logic low level to a logic high level.

In certain embodiments, the AND gate 970 includes an input terminal 972, an input terminal 974, and an output terminal 976. For example, the AND gate 970 is used as a control signal generator. In certain examples, the input terminal 972 receives the voltage detection signal 957, and the input terminal 974 receives the load detection signal 963. In some examples, the output terminal 976 sends a control signal 977. For example, if both the voltage detection signal 957 and the load detection signal 963 are at the logic high level, the control signal 977 is at the logic high level, and if the voltage detection signal 957 and/or the load detection signal 963 is at the logic low level, the control signal 977 is at the logic low level. As an example, if the control signal 977 changes from the logic low level to the logic high level, the switching power supply 500 changes from the discontinuous conduction mode to the continuous conduction mode (e.g., the deep continuous conduction mode).

According to some embodiments, the current source 916 receives the control signal 977 and generates a current 917 based at least in part on the control signal 977. In some examples, if the control signal 977 is at the logic low level, the current source 916 generates the current 917 at a predetermined higher magnitude, and if the control signal 977 is at the logic high level, the current source 916 generates the current 917 at a predetermined lower magnitude. For example, if the control signal 977 changes from the logic low level to the logic high level, the current 917 decreases from the predetermined higher magnitude to the predetermined lower magnitude. As an example, if the control signal 977 changers from the logic high level to the logic low level, the current 917 increases from the predetermined lower magnitude to the predetermined higher magnitude.

According to certain embodiments, the current mirror 910 uses the current 917 to generate an output current 913. For example, the output current 913 is equal to the current 917 multiplied by a predetermined constant. In certain examples, if the current 917 generated by the current source 916 decreases, an output current 913 of the current mirror 910 also decreases. For example, if the output current 913 of the current mirror 910 decreases, a current 945 that charges the capacitor 944 also decreases. As an example, if the current 945 that charges the capacitor 944 decreases, the rate of increase of a drive signal 923 that is received by a gate terminal of the transistor 922 also decreases. For example, if the rate of increase of the drive signal 923 decreases, the rate of increase of a source voltage 925 at a source terminal of the transistor 922 also decreases. As an example, if the rate of increase of the source voltage 925 decreases, the rate of increase of the drive signal 548 that is received by the gate terminal 582 of the transistor 570 also decreases.

In some embodiments, if the input voltage 566 (e.g., $V_{in}$) is larger than the input voltage threshold and the load (e.g., the output current 556) is larger than the predetermined load threshold, the control signal 977 is at the logic high level. For example, if the input voltage 566 (e.g., $V_{in}$) is larger than the input voltage threshold, the voltage detection signal 957 is at the logic high level. As an example, if the load (e.g., the output current 556) is larger than the predetermined load threshold, the load detection signal 963 is at the logic high level. In certain examples, both the voltage detection signal 957 and the load detection signal 963 are at the logic high level when the input voltage 566 (e.g., $V_{in}$) is high and the output current 556 (e.g., $I_{out}$) is also high. In some examples, when the control signal 977 changes from the logic low level to the logic high level, the rate of increase of the drive signal 548 that is received by the gate terminal 582 of the transistor 570 is reduced, and the spike that is formed by the voltage difference (e.g., $V_{ds2}$) from the drain terminal 590 to the source terminal 594 of the transistor 572 in response to the transistor 572 being turned off (e.g., after the transistor 572 becomes turned off) is lowered.

In certain embodiments, the pulse-width-modulation (PWM) controller 510 uses the input voltage 566 (e.g., $V_{in}$) and the voltage signal 544 to determine how fast the drive signal 923 that is received by the gate terminal of the transistor 922 rises and to control how fast drive signal 548 rises based at least in part on the rate of increase of the drive signal 923. For example, if the control signal 977 changes from the logic low level to the logic high level, the current 917 generated by the current source 916 decreases. As an example, if the input voltage 566 (e.g., $V_{in}$) becomes larger than the input voltage threshold and the load (e.g., the output current 556) becomes larger than the predetermined load threshold, the current 917 generated by the current source 916 decreases from the predetermined higher magnitude to the predetermined lower magnitude, reducing the rate of increase of the drive signal 548 that is received by the gate terminal 582 of the transistor 570 and also lowering the spike formed by the voltage difference (e.g., $V_{ds2}$) from the drain terminal 590 to the source terminal 594 of the transistor 572 in response to the transistor 572 being turned off (e.g., after the transistor 572 becomes turned off).

According to some embodiments, the voltage value of the drive signal 548 increases in three stages X, Y, and Z as shown in FIG. 9. For example, the waveform 990 represents the drive signal 923 (e.g., the voltage 923) at the gate terminal of the transistor 922 as a function of time if the control signal 977 is at the logic high level. As an example, the waveform 992 represents the drive signal 923 (e.g., the voltage 923) at the gate terminal of the transistor 922 as a function of time if the control signal 977 is at the logic low level.

In certain examples, as shown by the waveform 990, during the stage X, when the voltage value of the drive signal 548 is lower than the threshold voltage (e.g., $V_{th}$) of the transistor 570 and the transistor 570 is in an off state, the drive signal 923 (e.g., the voltage 923) at the gate terminal of the transistor 922 rises rapidly. In some examples, as shown by the waveform 990, during the stage Y, the drive signal 923 (e.g., the voltage 923) at the gate terminal of the transistor 922 rises less rapidly than during the stage X in order to reduce the electromagnetic interference (EMI). In certain examples, as shown by the waveform 990, during the stage Z, when the transistor 570 is fully turned on, the drive signal 923 (e.g., the voltage 923) at the gate terminal of the transistor 922 rises more rapidly than during the stage Y, in order to reduce the switching loss of the transistor 570 and improve the efficiency of the switching power supply 500.

In some examples, the waveforms 990 and 992 show certain differences in the drive signal 923 (e.g., the voltage 923) as a function of time between when the control signal 977 is at the logic high level and the control signal 977 is at the logic low level. For example, during the stage X, when the control signal 977 is at the logic high level, the drive signal 923 (e.g., the voltage 923) rises as rapidly as when the control signal 977 is at the logic low level. As an example, during the stage Y, when the control signal 977 is at the logic high level, the drive signal 923 (e.g., the voltage 923) rises more slowly as when the control signal 977 is at the logic low level. For example, during the stage Z, when the control signal 977 is at the logic high level, the drive signal 923 (e.g., the voltage 923) rises as rapidly as when the control signal 977 is at the logic low level.

As shown in FIG. 9, when the control signal 977 is at the logic high level, the drive signal 548 (e.g., the voltage 548) that is received by the gate terminal 582 of the transistor 570 rises more slowly than when the control signal 977 is at the logic low level according to certain embodiments. For example, when the control signal 977 is at the logic high level, the drive signal 548 (e.g., the voltage 548) rises at a rate of change (e.g., a rate of increase) that is smaller than when the control signal 977 is at the logic low level. As an example, when the control signal 977 remains at the same logic high level, the rate of change (e.g., a rate of increase) for the drive signal 548 (e.g., the voltage 548) changes with time.

According to some embodiments, if the drive signal 548 (e.g., the voltage 548) rises more slowly, the current 546 that flows through the transistor 570 is reduced when the transistor 570 starts being turned on. For example, if the drive signal 548 (e.g., the voltage 548) rises more slowly, the voltage difference (e.g., $V_{ds1}$) from the drain terminal 580 to the source terminal 584 of the transistor 570 decreases more slowly. As an example, if the drive signal 548 (e.g., the voltage 548) rises more slowly, the spike formed by the voltage difference (e.g., $V_{ds2}$) from the drain terminal 590 to the source terminal 594 of the transistor 572 is also reduced (e.g., lowered).

As discussed above and further emphasized here, FIG. 5 and FIG. 9 are merely examples, which should not unduly limit the scope of the claims. One of ordinary skill in the art would recognize many variations, alternatives, and modifications. In some embodiments, the voltage detector 950 determines whether the peak magnitude of the AC voltage exceeds a predetermined voltage threshold. For example, the voltage detector 950 determines whether the peak magnitude of the AC voltage exceeds the predetermined voltage threshold by detecting a voltage that is received at a terminal for high-voltage start-up of the pulse-width-modulation (PWM) controller 510. As an example, the voltage detector 950 determines whether the peak magnitude of the AC voltage exceeds the predetermined voltage threshold by detecting a signal that is received by the pulse-width-modulation (PWM) controller 510 from an auxiliary winding of the transformer 560 when the transistor 570 is turned on.

Certain embodiments of the present invention use the pulse-width-modulation (PWM) controller 510 to control the rate of increase at rising edges of the drive signal 548 that is received by the gate terminal 582 of the transistor 570 in order to reduce (e.g., lower) a spike in magnitude that is formed by a voltage difference from the drain terminal 590 to the source terminal 594 of the transistor 572 in response to the transistor 572 being turned off (e.g., after the transistor 572 becomes turned off). Some embodiments of the present invention control the drive signal 548 when the transistor 570 starts being turned on in order to reduce the current 546 when both the transistor 570 and the transistor 572 are turned on so that a spike in magnitude that is formed by a voltage difference from the drain terminal 590 to the source terminal 594 of the transistor 572 in response to the transistor 572 being turned off (e.g., after the transistor 572 becomes turned off) is lowered. Some embodiments of the present invention lower a spike in magnitude that is formed by a voltage difference from the drain terminal 590 to the source terminal 594 of the transistor 572 in response to the transistor 572 being turned off (e.g., after the transistor 572 becomes turned off) in order to reduce the electromagnetic interference (EMI).

According to some embodiments, a controller for a switching power supply includes: a first terminal configured to receive a feedback voltage representing an output voltage associated with a secondary winding of the switching power supply; a second terminal configured to output a drive voltage to a first transistor associated with a primary winding coupled to the secondary winding of the switching power supply; a comparator configured to receive the feedback voltage and a predetermined feedback threshold and generate a comparison signal based at least in part on the feedback voltage and the predetermined feedback threshold; a pulse-width detector configured to detect a pulse width of the drive voltage during a first switching cycle, compare the detected pulse width with a predetermined time threshold, and generate a detection signal based at least in part on the detected pulse width and the predetermined time threshold, the detected pulse width representing a length of time when the first transistor is turned on during the first switching cycle; a control signal generator configured to receive the comparison signal and the detection signal and generate a control signal based at least in part on the comparison signal and the detection signal; a current source configured to receive the control signal and generate a first current based at least in part on the control signal; a current mirror configured to generate a second current based at least in part on the first current; and a drive voltage generator configured to use the second current to raise the drive voltage at a rate of change to turn on the first transistor during a second switching cycle, the second switching cycle following the first switching cycle; wherein the current source is further configured to: generate the first current at a first magnitude if the feedback voltage is larger than the predetermined feedback threshold and the detected pulse width is larger than the predetermined time threshold; generate the first current at a second magnitude if the feedback voltage is smaller than the predetermined feedback threshold; and generate the first current at the second magnitude if the detected pulse width is smaller than the predetermined time threshold; wherein the drive voltage generator is further configured to: during the second switching cycle, raise the drive voltage at the rate of change equal to a first rate of increase in response to the first current being at the first magnitude; and during the second switching cycle, raise the drive voltage at the rate of change equal to a second rate of increase in response to the first current being at the second magnitude; wherein: the first magnitude is smaller than the second magnitude; and the first rate of increase is smaller than the second rate of increase. For example, the controller is implemented according to at least FIG. 8.

In certain examples, the comparator is further configured to: generate the comparison signal at a logic high level if the feedback voltage is larger than the predetermined feedback threshold; and generate the comparison signal at a logic low level if the feedback voltage is smaller than the predetermined feedback threshold. In some examples, the pulse-width detector is further configured to: generate the detection signal at the logic high level if the detected pulse width is larger than the predetermined time threshold; and generate the detection signal at the logic low level if the detected pulse width is smaller than the predetermined time threshold.

In certain examples, the control signal generator includes an AND gate configured to receive the comparison signal and the detection signal and generate the control signal based at least in part on the comparison signal and the detection signal. In some examples, the AND gate is further configured to: generate the control signal at the logic high level if the comparison signal is at the logic high level and the detection signal is at the logic high level; generate the control signal at the logic low level if the comparison signal is at the logic low level; and generate the control signal at the logic low level if the detection signal is at the logic low level.

In certain examples, the current source is further configured to: generate the first current at the first magnitude if the control signal is at the logic high level; and generate the first current at the second magnitude if the control signal is at the logic low level. In some examples, the current source is further configured to, if the control signal changes from the logic low level to the logic high level, decrease the first current from the second magnitude to the first magnitude.

In certain examples, the drive voltage generator is further configured to, in response to the control signal changing from the logic low level to the logic high level, reduce the rate of change of the drive voltage from the second rate of increase to the first rate of increase. In some examples, the drive voltage generator is further configured to, in response to the control signal changing from the logic low level to the logic high level, reduce the rate of change to lower a spike formed by a voltage difference from a drain terminal to a source terminal of a second transistor associated with the secondary winding in response to the second transistor being turned off. In certain examples, the second switching cycle follows immediately the first switching cycle.

According to certain embodiments, a controller for a switching power supply includes: a terminal configured to output a drive voltage to a first transistor associated with a primary winding coupled to a secondary winding of the switching power supply; a voltage detector configured to receive an input voltage associated with the primary winding, compare the input voltage with a first predetermined threshold, and generate a first detection signal based at least in part on the input voltage and the first predetermined threshold; a load detector configured to generate a second detection signal and change the second detection signal if an output current associated with the secondary winding becomes larger than a second predetermined threshold; a control signal generator configured to receive the first detection signal and the second detection signal and generate a control signal based at least in part on the first detection signal and the second detection signal; a current source configured to receive the control signal and generate a first current based at least in part on the control signal; a current mirror configured to generate a second current based at least in part on the first current; and a drive voltage generator configured to use the second current to raise the drive voltage at a rate of change to turn on the first transistor; wherein the current source is further configured to: generate the first current at a first magnitude if the input voltage is larger than the first predetermined threshold and the output current is larger than the second predetermined threshold;

generate the first current at a second magnitude if the input voltage is smaller than the first predetermined threshold; and generate the first current at the second magnitude if the output current is smaller than the second predetermined threshold; wherein the drive voltage generator is further configured to: raise the drive voltage at the rate of change equal to a first rate of increase in response to the first current being at the first magnitude; and raise the drive voltage at the rate of change equal to a second rate of increase in response to the first current being at the second magnitude; wherein: the first magnitude is smaller than the second magnitude; and the first rate of increase is smaller than the second rate of increase. For example, the controller is implemented according to at least FIG. 9.

In some examples, the voltage detector is further configured to: generate the first detection signal at a logic high level if the input voltage is larger than the first predetermined threshold; and generate the first detection signal at a logic low level if the input voltage is smaller than the first predetermined threshold. In certain examples, the load detector is further configured to: generate the second detection signal at the logic high level if the output current is larger than the second predetermined threshold; and generate the second detection signal at the logic low level if the output current is smaller than the second predetermined threshold.

In some examples, the control signal generator includes an AND gate configured to receive the first detection signal and the second detection signal and generate the control signal based at least in part on the first detection signal and the second detection signal. In certain examples, the AND gate is further configured to: generate the control signal at the logic high level if the first detection signal is at the logic high level and the second detection signal is at the logic high level; generate the control signal at the logic low level if the first detection signal is at the logic low level; and generate the control signal at the logic low level if the second detection signal is at the logic low level.

In some examples, the current source is further configured to: generate the first current at the first magnitude if the control signal is at the logic high level; and generate the first current at the second magnitude if the control signal is at the logic low level. In certain examples, the current source is further configured to, if the control signal changes from the logic low level to the logic high level, decrease the first current from the second magnitude to the first magnitude.

In certain examples, the drive voltage generator is further configured to, in response to the control signal changing from the logic low level to the logic high level, reduce the rate of change of the drive voltage from the second rate of increase to the first rate of increase. In some examples, the drive voltage generator is further configured to, in response to the control signal changing from the logic low level to the logic high level, reduce the rate of change to lower a spike formed by a voltage difference from a drain terminal to a source terminal of a second transistor associated with the secondary winding in response to the second transistor being turned off.

According to some embodiments, a method for a switching power supply includes: receiving a feedback voltage representing an output voltage associated with a secondary winding of the switching power supply; outputting a drive voltage to a first transistor associated with a primary winding coupled to the secondary winding of the switching power supply; receiving the feedback voltage and a predetermined feedback threshold; generating a comparison signal based at least in part on the feedback voltage and the predetermined feedback threshold; detecting a pulse width of the drive voltage during a first switching cycle, the detected pulse width representing a length of time when the first transistor is turned on during the first switching cycle; comparing the detected pulse width with a predetermined time threshold; generating a detection signal based at least in part on the detected pulse width and the predetermined time threshold; receiving the comparison signal and the detection signal; generating a control signal based at least in part on the comparison signal and the detection signal; receiving the control signal; generating a first current based at least in part on the control signal; generating a second current based at least in part on the first current; and using the second current to raise the drive voltage at a rate of change to turn on the first transistor during a second switching cycle, the second switching cycle following the first switching cycle; wherein the generating a first current based at least in part on the control signal includes: generating the first current at a first magnitude if the feedback voltage is larger than the predetermined feedback threshold and the detected pulse width is larger than the predetermined time threshold; generating the first current at a second magnitude if the feedback voltage is smaller than the predetermined feedback threshold; and generating the first current at the second magnitude if the detected pulse width is smaller than the predetermined time threshold; wherein the outputting a drive voltage to a first transistor associated with a primary winding coupled to the secondary winding of the switching power supply includes: during the second switching cycle, raising the drive voltage at the rate of change equal to a first rate of increase in response to the first current being at the first magnitude; and during the second switching cycle, raising the drive voltage at the rate of change equal to a second rate of increase in response to the first current being at the second magnitude; wherein: the first magnitude is smaller than the second magnitude; and the first rate of increase is smaller than the second rate of increase. For example, the method is implemented according to at least FIG. 8.

According to certain embodiments, a method for a switching power supply includes: outputting a drive voltage to a first transistor associated with a primary winding coupled to a secondary winding of the switching power supply; receiving an input voltage associated with the primary winding; comparing the input voltage with a first predetermined threshold; generating a first detection signal based at least in part on the input voltage and the first predetermined threshold; generating a second detection signal; changing the second detection signal if an output current associated with the secondary winding becomes larger than a second predetermined threshold; receiving the first detection signal and the second detection signal; generating a control signal based at least in part on the first detection signal and the second detection signal; receiving the control signal; generating a first current based at least in part on the control signal; generating a second current based at least in part on the first current; and using the second current to raise the drive voltage at a rate of change to turn on the first transistor; wherein the generating a first current based at least in part on the control signal includes: generating the first current at a first magnitude if the input voltage is larger than the first predetermined threshold and the output current is larger than the second predetermined threshold; generating the first current at a second magnitude if the input voltage is smaller than the first predetermined threshold; and generating the first current at the second magnitude if the output current is smaller than the second predetermined threshold; wherein the outputting a drive voltage to a first transistor associated with a primary winding coupled to a secondary winding of the switching power supply includes: raising the drive voltage at the rate of change equal to a first rate of increase in response to the first current being at the first magnitude; and raising the drive voltage at the rate of change equal to a second rate of increase in response to the first current being at the second magnitude; wherein: the first magnitude is smaller than the second magnitude; and the first rate of increase is smaller than the second rate of increase. For example, the method is implemented according to at least FIG. 9.

For example, some or all components of various embodiments of the present invention each are, individually and/or in combination with at least another component, implemented using one or more software components, one or more hardware components, and/or one or more combinations of software and hardware components. As an example, some or all components of various embodiments of the present invention each are, individually and/or in combination with at least another component, implemented in one or more circuits, such as one or more analog circuits and/or one or more digital circuits. For example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments.

What is claimed is:

1. A controller for a switching power supply, the controller comprising:
    a first terminal configured to receive a feedback voltage representing an output voltage associated with a secondary winding of the switching power supply;
    a second terminal configured to output a drive voltage to a first transistor associated with a primary winding coupled to the secondary winding of the switching power supply;
    a comparator configured to receive the feedback voltage and a predetermined feedback threshold and generate a comparison signal based at least in part on the feedback voltage and the predetermined feedback threshold;
    a pulse-width detector configured to detect a pulse width of the drive voltage during a first switching cycle, compare the detected pulse width with a predetermined time threshold, and generate a detection signal based at least in part on the detected pulse width and the predetermined time threshold, the detected pulse width representing a length of time when the first transistor is turned on during the first switching cycle;
    a control signal generator configured to receive the comparison signal and the detection signal and generate a control signal based at least in part on the comparison signal and the detection signal;
    a current source configured to receive the control signal and generate a first current based at least in part on the control signal;
    a current mirror configured to generate a second current based at least in part on the first current; and
    a drive voltage generator configured to use the second current to raise the drive voltage at a rate of change to turn on the first transistor during a second switching cycle, the second switching cycle following the first switching cycle;
    wherein the current source is further configured to:
        generate the first current at a first magnitude if the feedback voltage is larger than the predetermined feedback threshold and the detected pulse width is larger than the predetermined time threshold;
        generate the first current at a second magnitude if the feedback voltage is smaller than the predetermined feedback threshold; and
        generate the first current at the second magnitude if the detected pulse width is smaller than the predetermined time threshold;
    wherein the drive voltage generator is further configured to:
        during the second switching cycle, raise the drive voltage at the rate of change equal to a first rate of increase in response to the first current being at the first magnitude; and
        during the second switching cycle, raise the drive voltage at the rate of change equal to a second rate of increase in response to the first current being at the second magnitude;
    wherein:
        the first magnitude is smaller than the second magnitude; and
        the first rate of increase is smaller than the second rate of increase.

2. The controller of claim 1 wherein the comparator is further configured to:
    generate the comparison signal at a logic high level if the feedback voltage is larger than the predetermined feedback threshold; and
    generate the comparison signal at a logic low level if the feedback voltage is smaller than the predetermined feedback threshold.

3. The controller of claim 2 wherein the pulse-width detector is further configured to:
    generate the detection signal at the logic high level if the detected pulse width is larger than the predetermined time threshold; and
    generate the detection signal at the logic low level if the detected pulse width is smaller than the predetermined time threshold.

4. The controller of claim 3 wherein the control signal generator includes an AND gate configured to receive the comparison signal and the detection signal and generate the control signal based at least in part on the comparison signal and the detection signal.

5. The controller of claim 4 wherein the AND gate is further configured to:
    generate the control signal at the logic high level if the comparison signal is at the logic high level and the detection signal is at the logic high level;
    generate the control signal at the logic low level if the comparison signal is at the logic low level; and
    generate the control signal at the logic low level if the detection signal is at the logic low level.

6. The controller of claim 5 wherein the current source is further configured to:
    generate the first current at the first magnitude if the control signal is at the logic high level; and
    generate the first current at the second magnitude if the control signal is at the logic low level.

7. The controller of claim 6 wherein the current source is further configured to, if the control signal changes from the logic low level to the logic high level, decrease the first current from the second magnitude to the first magnitude.

8. The controller of claim 7 wherein the drive voltage generator is further configured to, in response to the control signal changing from the logic low level to the logic high level, reduce the rate of change of the drive voltage from the second rate of increase to the first rate of increase.

9. The controller of claim 8 wherein the drive voltage generator is further configured to, in response to the control signal changing from the logic low level to the logic high level, reduce the rate of change to lower a spike formed by a voltage difference from a drain terminal to a source terminal of a second transistor associated with the secondary winding in response to the second transistor being turned off.

10. The controller of claim 1 wherein the second switching cycle follows immediately the first switching cycle.

11. A controller for a switching power supply, the controller comprising:
 a terminal configured to output a drive voltage to a first transistor associated with a primary winding coupled to a secondary winding of the switching power supply;
 a voltage detector configured to receive an input voltage associated with the primary winding, compare the input voltage with a first predetermined threshold, and generate a first detection signal based at least in part on the input voltage and the first predetermined threshold;
 a load detector configured to generate a second detection signal and change the second detection signal if an output current associated with the secondary winding becomes larger than a second predetermined threshold;
 a control signal generator configured to receive the first detection signal and the second detection signal and generate a control signal based at least in part on the first detection signal and the second detection signal;
 a current source configured to receive the control signal and generate a first current based at least in part on the control signal;
 a current mirror configured to generate a second current based at least in part on the first current; and
 a drive voltage generator configured to use the second current to raise the drive voltage at a rate of change to turn on the first transistor;
 wherein the current source is further configured to:
  generate the first current at a first magnitude if the input voltage is larger than the first predetermined threshold and the output current is larger than the second predetermined threshold;
  generate the first current at a second magnitude if the input voltage is smaller than the first predetermined threshold; and
  generate the first current at the second magnitude if the output current is smaller than the second predetermined threshold;
 wherein the drive voltage generator is further configured to:
  raise the drive voltage at the rate of change equal to a first rate of increase in response to the first current being at the first magnitude; and
  raise the drive voltage at the rate of change equal to a second rate of increase in response to the first current being at the second magnitude;
 wherein:
  the first magnitude is smaller than the second magnitude; and
  the first rate of increase is smaller than the second rate of increase.

12. The controller of claim 11 wherein the voltage detector is further configured to:
 generate the first detection signal at a logic high level if the input voltage is larger than the first predetermined threshold; and
 generate the first detection signal at a logic low level if the input voltage is smaller than the first predetermined threshold.

13. The controller of claim 12 wherein the load detector is further configured to:
 generate the second detection signal at the logic high level if the output current is larger than the second predetermined threshold; and
 generate the second detection signal at the logic low level if the output current is smaller than the second predetermined threshold.

14. The controller of claim 13 wherein the control signal generator includes an AND gate configured to receive the first detection signal and the second detection signal and generate the control signal based at least in part on the first detection signal and the second detection signal.

15. The controller of claim 14 wherein the AND gate is further configured to:
 generate the control signal at the logic high level if the first detection signal is at the logic high level and the second detection signal is at the logic high level;
 generate the control signal at the logic low level if the first detection signal is at the logic low level; and
 generate the control signal at the logic low level if the second detection signal is at the logic low level.

16. The controller of claim 15 wherein the current source is further configured to:
 generate the first current at the first magnitude if the control signal is at the logic high level; and
 generate the first current at the second magnitude if the control signal is at the logic low level.

17. The controller of claim 16 wherein the current source is further configured to, if the control signal changes from the logic low level to the logic high level, decrease the first current from the second magnitude to the first magnitude.

18. The controller of claim 17 wherein the drive voltage generator is further configured to, in response to the control signal changing from the logic low level to the logic high level, reduce the rate of change of the drive voltage from the second rate of increase to the first rate of increase.

19. The controller of claim 18 wherein the drive voltage generator is further configured to, in response to the control signal changing from the logic low level to the logic high level, reduce the rate of change to lower a spike formed by a voltage difference from a drain terminal to a source terminal of a second transistor associated with the secondary winding in response to the second transistor being turned off.

20. A method for a switching power supply, the method comprising:
 receiving a feedback voltage representing an output voltage associated with a secondary winding of the switching power supply;
 outputting a drive voltage to a first transistor associated with a primary winding coupled to the secondary winding of the switching power supply;
 receiving the feedback voltage and a predetermined feedback threshold;
 generating a comparison signal based at least in part on the feedback voltage and the predetermined feedback threshold;
 detecting a pulse width of the drive voltage during a first switching cycle, the detected pulse width representing a length of time when the first transistor is turned on during the first switching cycle;
 comparing the detected pulse width with a predetermined time threshold;

generating a detection signal based at least in part on the detected pulse width and the predetermined time threshold;
receiving the comparison signal and the detection signal;
generating a control signal based at least in part on the comparison signal and the detection signal;
receiving the control signal;
generating a first current based at least in part on the control signal;
generating a second current based at least in part on the first current; and
using the second current to raise the drive voltage at a rate of change to turn on the first transistor during a second switching cycle, the second switching cycle following the first switching cycle;
wherein the generating a first current based at least in part on the control signal includes:
  generating the first current at a first magnitude if the feedback voltage is larger than the predetermined feedback threshold and the detected pulse width is larger than the predetermined time threshold;
  generating the first current at a second magnitude if the feedback voltage is smaller than the predetermined feedback threshold; and
  generating the first current at the second magnitude if the detected pulse width is smaller than the predetermined time threshold;
wherein the outputting a drive voltage to a first transistor associated with a primary winding coupled to the secondary winding of the switching power supply includes:
  during the second switching cycle, raising the drive voltage at the rate of change equal to a first rate of increase in response to the first current being at the first magnitude; and
  during the second switching cycle, raising the drive voltage at the rate of change equal to a second rate of increase in response to the first current being at the second magnitude;
wherein:
  the first magnitude is smaller than the second magnitude; and
  the first rate of increase is smaller than the second rate of increase.

21. A method for a switching power supply, the method comprising:
outputting a drive voltage to a first transistor associated with a primary winding coupled to a secondary winding of the switching power supply;
receiving an input voltage associated with the primary winding;
comparing the input voltage with a first predetermined threshold;
generating a first detection signal based at least in part on the input voltage and the first predetermined threshold;
generating a second detection signal;
changing the second detection signal if an output current associated with the secondary winding becomes larger than a second predetermined threshold;
receiving the first detection signal and the second detection signal;
generating a control signal based at least in part on the first detection signal and the second detection signal;
receiving the control signal;
generating a first current based at least in part on the control signal;
generating a second current based at least in part on the first current; and
using the second current to raise the drive voltage at a rate of change to turn on the first transistor;
wherein the generating a first current based at least in part on the control signal includes:
  generating the first current at a first magnitude if the input voltage is larger than the first predetermined threshold and the output current is larger than the second predetermined threshold;
  generating the first current at a second magnitude if the input voltage is smaller than the first predetermined threshold; and
  generating the first current at the second magnitude if the output current is smaller than the second predetermined threshold;
wherein the outputting a drive voltage to a first transistor associated with a primary winding coupled to a secondary winding of the switching power supply includes:
  raising the drive voltage at the rate of change equal to a first rate of increase in response to the first current being at the first magnitude; and
  raising the drive voltage at the rate of change equal to a second rate of increase in response to the first current being at the second magnitude;
wherein:
  the first magnitude is smaller than the second magnitude; and
  the first rate of increase is smaller than the second rate of increase.

* * * * *